US007333110B2

(12) United States Patent
Arnold et al.

(10) Patent No.: US 7,333,110 B2
(45) Date of Patent: *Feb. 19, 2008

(54) ADJUSTED STROKE RENDERING

(75) Inventors: R. David Arnold, Mountain View, CA (US); Terence S. Dowling, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 189 days.

This patent is subject to a terminal disclaimer.

(21) Appl. No.: 10/816,587

(22) Filed: Mar. 31, 2004

(65) Prior Publication Data

US 2005/0219248 A1 Oct. 6, 2005

(51) Int. Cl.
*G06T 11/00* (2006.01)

(52) U.S. Cl. ...................... 345/467; 345/470; 345/471; 345/472

(58) Field of Classification Search ................ 345/467, 345/470, 471, 472
See application file for complete search history.

(56) References Cited

U.S. PATENT DOCUMENTS 4,200,861 A 4/1980 Hubach et al.
4,331,955 A 5/1982 Hansen
4,486,785 A * 12/1984 Lasher et al. ............... 358/447
4,580,231 A 4/1986 Tidd et al.
4,591,844 A * 5/1986 Hickin et al. ............... 345/614
4,667,247 A 5/1987 Karow
4,672,369 A 6/1987 Preiss et al.
4,675,830 A 6/1987 Hawkins
4,720,705 A 1/1988 Gupta et al.
4,780,711 A * 10/1988 Doumas ..................... 345/614
4,783,652 A 11/1988 Lumelsky
4,827,255 A 5/1989 Ishii
4,851,825 A 7/1989 Naiman (Continued)

FOREIGN PATENT DOCUMENTS

EP 0 214 547 3/1987

(Continued)

OTHER PUBLICATIONS http://www.truetype.demon.co.uk/tthist.htm, "A History of TrueType".*

(Continued)

*Primary Examiner*—Ulka Chauhan
*Assistant Examiner*—Jeffrey J. Chow
(74) *Attorney, Agent, or Firm*—Fish & Richardson P.C.

(57) ABSTRACT

Methods and apparatus implementing and using techniques for rendering a stroke (e.g., a line or glyph). An initial adjustment value can be calculated for the stroke, and an offset amount calculated based on the initial adjustment value, such that a minimum number of device pixels will be marked by the stroke after adjusting density values of device pixels representing the stroke. A high resolution representation of the stroke (e.g., a set of device pixels each having an initial density value) is rendered so that one or more edges of the stroke is offset from a device resolution grid by the offset amount. A length of an edge of the stroke that passes through a device pixel can be calculated, and the density value of the device pixel adjusted by a final adjustment value based on the initial adjustment value and the length of the edge of the stroke.

24 Claims, 35 Drawing Sheets

U.S. PATENT DOCUMENTS

| | | | | |
|---|---|---|---|---|
| 4,907,282 | A | 3/1990 | Daly et al. | |
| 4,908,780 | A * | 3/1990 | Priem et al. | 345/611 |
| 4,945,351 | A | 7/1990 | Naiman | |
| 5,099,435 | A | 3/1992 | Collins et al. | |
| 5,132,674 | A | 7/1992 | Bottorf | |
| 5,241,653 | A | 8/1993 | Collins et al. | |
| 5,278,678 | A | 1/1994 | Harrington | |
| 5,280,577 | A | 1/1994 | Trevett et al. | |
| 5,299,308 | A | 3/1994 | Suzuki et al. | |
| 5,301,267 | A | 4/1994 | Hassett et al. | |
| 5,325,479 | A * | 6/1994 | Kaasila | 345/469 |
| 5,386,509 | A | 1/1995 | Suzuki et al. | |
| 5,398,306 | A | 3/1995 | Karow | |
| 5,459,828 | A | 10/1995 | Zack et al. | |
| 5,517,601 | A * | 5/1996 | Rust et al. | 358/1.11 |
| 5,544,294 | A | 8/1996 | Cho et al. | |
| 5,568,597 | A | 10/1996 | Nakayama et al. | |
| 5,633,991 | A * | 5/1997 | Hakaridani et al. | 358/1.11 |
| 5,664,086 | A | 9/1997 | Brock et al. | |
| 5,684,510 | A | 11/1997 | Brassell et al. | |
| 5,771,048 | A | 6/1998 | Nankou et al. | |
| 5,808,600 | A | 9/1998 | Mochizuki | |
| 5,852,448 | A | 12/1998 | Cheng | |
| 5,857,067 | A | 1/1999 | Hassett et al. | |
| 5,909,221 | A | 6/1999 | Nakai et al. | |
| 5,910,805 | A | 6/1999 | Hickey et al. | |
| 5,929,866 | A * | 7/1999 | Arnold | 345/471 |
| 5,940,080 | A | 8/1999 | Ruehle et al. | |
| 5,943,063 | A | 8/1999 | Dowling | |
| 5,959,634 | A | 9/1999 | Yoshida | |
| 6,005,588 | A | 12/1999 | Guha | |
| 6,104,833 | A | 8/2000 | Naoi et al. | |
| 6,229,521 | B1 | 5/2001 | Yip | |
| 6,236,390 | B1 | 5/2001 | Hitchcock | |
| 6,282,327 | B1 | 8/2001 | Betrisey et al. | |
| 6,288,725 | B1 | 9/2001 | Fu | |
| 6,323,879 | B1 | 11/2001 | Sauerbrei | |
| 6,330,003 | B1 | 12/2001 | Curtis et al. | |
| 6,342,890 | B1 | 1/2002 | Shetter | |
| 6,356,278 | B1 | 3/2002 | Stamm et al. | |
| 6,369,902 | B1 | 4/2002 | Beaman et al. | |
| 6,377,262 | B1 * | 4/2002 | Hitchcock et al. | 345/467 |
| 6,384,839 | B1 * | 5/2002 | Paul | 345/613 |
| 6,438,576 | B1 | 8/2002 | Huang et al. | |
| 6,459,431 | B1 | 10/2002 | Browne et al. | |
| 6,563,502 | B1 | 5/2003 | Dowling et al. | |
| 6,614,432 | B1 | 9/2003 | Merrill | |
| 6,950,986 | B1 * | 9/2005 | Jacobi et al. | 715/520 |
| 2001/0048764 | A1 | 12/2001 | Betrisey et al. | |
| 2002/0093476 | A1 | 7/2002 | Hill et al. | |
| 2002/0093502 | A1 | 7/2002 | Koyama | |
| 2002/0108521 | A1 | 8/2002 | Velde et al. | |
| 2003/0214513 | A1 * | 11/2003 | Brown et al. | 345/611 |
| 2004/0001069 | A1 | 1/2004 | Snyder et al. | |
| 2004/0227770 | A1 | 11/2004 | Dowling et al. | |
| 2004/0227771 | A1 | 11/2004 | Arnold et al. | |
| 2006/0017733 | A1 | 1/2006 | Matskewich et a. | |

FOREIGN PATENT DOCUMENTS

| | | |
|---|---|---|
| EP | 0 397 299 | 11/1990 |
| EP | 0 428 356 | 5/1991 |
| EP | 0 435 391 | 7/1991 |
| EP | 0 468 652 | 1/1992 |
| EP | 0 506 381 | 9/1992 |
| EP | 0 304 509 | 6/1993 |
| EP | 0 590 923 | 4/1994 |
| EP | 0 654 778 | 5/1995 |
| EP | 0 667 596 | 8/1995 |
| EP | 0 693 740 | 1/1996 |
| EP | 0 772 144 | 5/1997 |
| EP | 1 077 445 | 2/2001 |
| GB | 2 236 463 | 4/1991 |
| JP | 2-275494 | 11/1990 |
| JP | 900039606 | 10/1991 |
| WO | 86/04703 | 8/1986 |
| WO | 94/06094 | 3/1994 |
| WO | 94/29843 | 12/1994 |
| WO | 00/52673 | 9/2000 |
| WO | 2004/104933 | 12/2004 |
| WO | 2004/104937 | 12/2004 |

OTHER PUBLICATIONS

Phinney, Thomas W., "TrueType & Post Script Type 1: What's the Difference?", http://www.truetype.demond.co.uk/articles/ttvst1.htm, Oct. 1, 1997.*

Foley et al.; "Computer Graphics Principles and Practice—Second Edition"; Addison-Wesley Publishing Company; 1990; pp. 584-586, 589-590, 599-600 and 693-695.

SMPTE 170M-1999, SMPTE Standard for Television, "Composite Analog Video Signal—NTSC for Studio Applications," The Society of Motion Picture and Television Engineers.

Foley et al.; "Computer Graphics Principles and Practice—Second Edition"; Addison-Wesley Publishing Company; 1990; pp. 132-140, pp. 617-646, and pp. 965-979.

"gasp—Grid-fitting And Scan-conversion Procedure", http://www.microsoft.com/typography/otspec/gast.htm, 1998, 2 pages.

"The TrueType instruction set", http://www.microsoft.com/typography/otspec/ttinst.htm, 1997, Cover sheet (1 page); pp. 181-261.

Platt, John C., Optimal Filtering for Patterned Displays, Microsoft Research, IEEE Signal Processing Letters, vol. 7, No. 7, pp. 179-180 (2000).

Betrisey, et al., 20.4: Displaced Filtering for Patterned Displays, SID 00 Digest, 4 pages.

Microsoft Corporation, What is ClearType? [online], page last updated Jan. 16, 2002, www.microsoft.com/typography/cleartype/what.htm?frame=%208fsize.

Microsoft Corporation, Microsoft ClearType FAQ [online], page last updated Sep. 26, 2002,. http://www.microsoft.com/typography/faq/faq15.htm.

Microsoft Corporation, ClearType Antialiasing, 2003 [online], http://msdn.microsoft.com/library/default.asp?url=/library/en-us/gdi/fonttext-osgn.asp.

Sub-Pixel Font Rendering Technology—Implementation Details, [online] [retrieved Oct. 5, 2004] retrieved from the Internet <URL: http://grc.com/cttech.htm> last edit on Dec. 8, 1999.

Sub-Pixel Font Rendering Technology—Who Did It First? [online] [retrieved Oct. 5, 2004] retrieved from the Internet <URL: http://grc.com/ctwho.htm>last edit on Feb. 29, 2000.

Sub-Pixel Font Rendering Technology—Visitor Dialog Q&A [online] [retrieved Jul. 16, 2004], retrieved from the Internet <URL: http://grc.com/ctdialog.htm> last edit Oct. 4, 2003.

Sub-Pixel Font Rendering Technology—How It Works [online] [retrieved Jul. 16, 2005] retrieved from the Internet <URL: http://grc.com/ctwhat.htm> last edit on Feb. 11, 2002.

Taligent Documentation, "Miter limit joint", http://www.cubik.org/mirors/taligent/Docs/books/GS/GS_13..html, 1995.

Wikipedia, "Transformation matrix", http://cn.wikipedia.org/wiki/Matrix_transformation.

* cited by examiner

Font Type: Type 1 Gray Scale

800

| Scaled Stem Width (1/16ths) 802 | X Grid Ratio 804 | Y Grid Ratio 806 | Hint Grid Ratio 808 | Hinting Policy 809 | X Align. 810 | Y Align. 812 | X Offset Amt. 814 | Y Offset Amt. 816 | X Carry (y/n) 818 | Y Carry (y/n) 820 | Initial Adjustment Value (1/16ths) 822 |
|---|---|---|---|---|---|---|---|---|---|---|---|
| 0 | 4 | 4 | 4 | Black Edge | 4 | 4 | 0 | 1 | 1 | 1 | 4 |
| 1 | 4 | 4 | 4 | Black Edge | 4 | 4 | 0 | 1 | 1 | 1 | 4 |
| 2 | 4 | 4 | 4 | Black Edge | 4 | 4 | 0 | 1 | 1 | 1 | 4 |
| 3 | 4 | 4 | 4 | Black Edge | 4 | 4 | 0 | 1 | 1 | 1 | 4 |
| 4 | 4 | 4 | 4 | Black Edge | 4 | 4 | 0 | 1 | 1 | 1 | 4 |
| 803 5 | 8 | 8 | 8 | Black Edge | 8 | 8 | 0 | 1 | 1 | 1 | 4 |
| 6 | 8 | 8 | 8 | Black Edge | 8 | 8 | 0 | 1 | 1 | 1 | 4 |
| 7 | 8 | 8 | 8 | Black Edge | 8 | 8 | 0 | 1 | 1 | 1 | 4 |
| 8 | 8 | 8 | 8 | Black Edge | 8 | 8 | 0 | 1 | 1 | 1 | 4 |
| 9 | 8 | 8 | 8 | Black Edge | 8 | 8 | 0 | 1 | 1 | 1 | 4 |
| 10 | 8 | 8 | 8 | Black Edge | 8 | 8 | 0 | 1 | 1 | 1 | 4 |
| 11 | 4 | 4 | 4 | Black Edge | 4 | 4 | 1 | 1 | 1 | 0 | 4 |
| 807 12 | 4 | 4 | 4 | Black Edge | 4 | 4 | 1 | 1 | 1 | 0 | 4 |
| 13 | 8 | 8 | 8 | Black Edge | 8 | 8 | 1 | 1 | 1 | 1 | 3 |
| 14 | 8 | 8 | 8 | Black Edge | 8 | 8 | 1 | 1 | 1 | 1 | 3 |
| 15 | 8 | 8 | 8 | Black Edge | 8 | 8 | 1 | 1 | 1 | 1 | 3 |
| 16 | 8 | 8 | 8 | Black Edge | 8 | 8 | 1 | 1 | 1 | 1 | 3 |
| 17 | 8 | 8 | 8 | Black Edge | 8 | 8 | 1 | 1 | 1 | 1 | 2 |

| Scaled Stem Width (1/16ths) 802 | X Grid Ratio 804 | Y Grid Ratio 806 | Hint Grid Ratio 808 | Hinting Policy 809 | X Align. 810 | Y Align. 812 | X Offset Amt. 814 | Y Offset Amt. 816 | X Carry (y/n) 818 | Y Carry (y/n) 820 | Initial Adjustment Value (1/16ths) 822 |
|---|---|---|---|---|---|---|---|---|---|---|---|
| 18 | 8 | 8 | 8 | Black Edge | 8 | 8 | 1 | 1 | 1 | 1 | 2 |
| 19 | 8 | 8 | 8 | Black Edge | 8 | 8 | 1 | 1 | 1 | 1 | 2 |
| 20 | 8 | 8 | 8 | Black Edge | 8 | 8 | 1 | 1 | 1 | 1 | 2 |
| 21 | 8 | 8 | 8 | Black Edge | 8 | 8 | 1 | 1 | 1 | 1 | 2 |
| 22 | 8 | 8 | 8 | Black Edge | 8 | 8 | 1 | 1 | 1 | 1 | 2 |
| 23 | 8 | 8 | 8 | Black Edge | 8 | 8 | 1 | 1 | 1 | 1 | 2 |
| 24 | 8 | 8 | 8 | Black Edge | 8 | 8 | 1 | 1 | 1 | 1 | 2 |
| 25 | 8 | 8 | 8 | Black Edge | 8 | 8 | 1 | 1 | 1 | 1 | 2 |
| 26 | 4 | 4 | 4 | Black Edge | 4 | 4 | 0 | 0 | 1 | 0 | 1 |
| 27 | 4 | 4 | 4 | Black Edge | 4 | 4 | 0 | 0 | 1 | 0 | 1 |
| 28 | 4 | 4 | 4 | Black Edge | 4 | 4 | 0 | 0 | 1 | 0 | 1 |
| 29 | 8 | 8 | 8 | Black Edge | 8 | 8 | 1 | 1 | 1 | 1 | 1 |
| 30 | 8 | 8 | 8 | Black Edge | 8 | 8 | 1 | 1 | 1 | 1 | 1 |
| 31 | 8 | 8 | 8 | Black Edge | 8 | 8 | 1 | 1 | 1 | 1 | 1 |
| 32 | 8 | 8 | 8 | Black Edge | 8 | 8 | 1 | 1 | 1 | 1 | 1 |
| 33 | 8 | 8 | 8 | Black Edge | 8 | 8 | 1 | 1 | 1 | 1 | 1 |
| 34 | 4 | 4 | 4 | Black Edge | 4 | 4 | 0 | 0 | 1 | 0 | 0 |
| 35 | 4 | 4 | 4 | Black Edge | 4 | 4 | 0 | 0 | 1 | 0 | 0 |
| 36 | 4 | 4 | 4 | Black Edge | 4 | 4 | 0 | 0 | 1 | 0 | 0 |
| 37 | 4 | 4 | 4 | Black Edge | 4 | 4 | 0 | 0 | 1 | 0 | 0 |

FIG. 8A (Cont'd)

Font Type: Type 1 Gray Scale

| Scaled Stem Width (1/16ths) | 850 Asymmetric Adjusting (y/n) | 852 Low Density | 854 Low Initial Adjustment Value (1/16ths) | 856 High Density | 858 High Initial Adjustment Value (1/16ths) |
|---|---|---|---|---|---|
| 0 | 0 | 0 | 0 | 0 | 0 |
| 1 | 0 | 0 | 0 | 0 | 0 |
| 2 | 0 | 0 | 0 | 0 | 0 |
| 3 | 0 | 0 | 0 | 0 | 0 |
| 4 | 0 | 0 | 0 | 0 | 0 |
| 860 5 | 1 | 0 | 2 | 24 | 6 |
| 6 | 1 | 0 | 2 | 24 | 6 |
| 7 | 1 | 0 | 2 | 32 | 6 |
| 8 | 1 | 0 | 2 | 32 | 6 |
| 9 | 1 | 0 | 2 | 40 | 6 |
| 10 | 1 | 0 | 2 | 40 | 6 |
| 11 | 0 | 0 | 0 | 0 | 0 |
| 805 12 | 0 | 0 | 0 | 0 | 0 |
| 13 | 1 | 0 | 4 | 56 | 2 |
| 14 | 1 | 0 | 4 | 56 | 2 |
| 15 | 1 | 8 | 4 | 56 | 2 |
| 16 | 1 | 8 | 4 | 56 | 2 |
| 17 | 0 | 0 | 0 | 0 | 0 |
| 18 | 0 | 0 | 0 | 0 | 0 |
| 19 | 0 | 0 | 0 | 0 | 0 |
| 20 | 0 | 0 | 0 | 0 | 0 |

FIG. 8B

| Scaled Stem Width (1/16ths) | Asymmetric Adjusting (y/n) (850) | Low Density (852) | Low Initial Adjustment Value (1/16ths) (854) | High Density (856) | High Initial Adjustment Value (1/16ths) (858) |
|---|---|---|---|---|---|
| 21 | 0 | 0 | 0 | 0 | 0 |
| 22 | 0 | 0 | 0 | 0 | 0 |
| 23 | 0 | 0 | 0 | 0 | 0 |
| 24 | 0 | 0 | 0 | 0 | 0 |
| 25 | 0 | 0 | 0 | 0 | 0 |
| 26 | 1 | 0 | 0 | 12 | 2 |
| 27 | 1 | 0 | 0 | 12 | 2 |
| 28 | 1 | 0 | 0 | 12 | 2 |
| 29 | 1 | 0 | 2 | 56 | 0 |
| 30 | 1 | 0 | 2 | 56 | 0 |
| 31 | 1 | 8 | 0 | 56 | 2 |
| 32 | 1 | 8 | 0 | 56 | 2 |
| 33 | 1 | 16 | 0 | 56 | 2 |
| 34 | 0 | 0 | 0 | 0 | 0 |
| 35 | 0 | 0 | 0 | 0 | 0 |
| 36 | 0 | 0 | 0 | 0 | 0 |
| 37 | 0 | 0 | 0 | 0 | 0 |

FIG. 8B (Cont'd)

Font Type: Type 1 Sub Pixel Rendering 842

| Scaled Stem Width (1/8th) | X Grid Ratio | Y Grid Ratio | Hint Grid Ratio | X Align. | Y Align. | X Offset Amt. | Y Offset Amt. | X Carry (y/n) | Y Carry (y/n) | Hinting Policy | Initial Adjustment Value (1/16th) |
|---|---|---|---|---|---|---|---|---|---|---|---|
| 0 | 6 | 6 | 6 | 1 | 6 | 0 | 0 | 1 | 0 | Black Edge | 3 |
| 1 | 6 | 6 | 6 | 1 | 6 | 0 | 0 | 1 | 0 | Black Edge | 3 |
| 2 | 6 | 6 | 6 | 1 | 6 | 0 | 0 | 1 | 0 | Black Edge | 3 |
| 3 | 6 | 6 | 6 | 1 | 6 | 0 | 0 | 1 | 0 | Black Edge | 3 |
| 4 | 6 | 6 | 6 | 1 | 6 | 0 | 0 | 1 | 0 | Black Edge | 3 |
| 5 | 6 | 6 | 6 | 1 | 6 | 0 | 0 | 1 | 0 | Black Edge | 2 |
| 6 | 6 | 6 | 6 | 1 | 6 | 0 | 0 | 1 | 0 | Black Edge | 2 |
| 7 | 6 | 6 | 6 | 1 | 6 | 0 | 0 | 1 | 0 | Black Edge | 2 |
| 8 | 6 | 6 | 6 | 1 | 6 | 0 | 0 | 1 | 0 | Black Edge | 2 |
| 9 | 6 | 6 | 6 | 1 | 6 | 0 | 0 | 1 | 0 | Black Edge | 2 |
| 10 | 6 | 6 | 6 | 1 | 6 | 0 | 0 | 1 | 0 | Black Edge | 2 |
| 11 | 6 | 6 | 6 | 1 | 6 | 0 | 0 | 1 | 0 | Black Edge | 1 |
| 12 | 6 | 6 | 6 | 1 | 6 | 0 | 0 | 1 | 0 | Black Edge | 1 |
| 13 | 6 | 6 | 6 | 1 | 6 | 0 | 0 | 1 | 0 | Black Edge | 0 |

Font Type: True Type Gray Scale

| Scaled Stem Width (1/4ths) | X Grid Ratio | Y Grid Ratio | Hint Grid Ratio | X Align. | Y Align. | X Offset Amt. | Y Offset Amt. | X Carry (y/n) | Y Carry (y/n) | Hinting Policy | Initial Adjustment Value (1/4ths) |
|---|---|---|---|---|---|---|---|---|---|---|---|
| 0 | 4 | 4 | 4 | 0 | 0 | 0 | 0 | 1 | 1 | No Smoothing | 4 |
| 1 | 4 | 4 | 4 | 0 | 0 | 0 | 0 | 1 | 1 | No Smoothing | 4 |
| 2 | 4 | 4 | 4 | 0 | 0 | 0 | 0 | 1 | 1 | No Smoothing | 4 |
| 3 | 4 | 4 | 4 | 0 | 0 | 0 | 0 | 1 | 1 | No Smoothing | 3 |
| 4 | 4 | 4 | 4 | 0 | 0 | 0 | 0 | 1 | 1 | No Smoothing | 2 |
| 5 | 4 | 4 | 4 | 0 | 0 | 0 | 0 | 1 | 1 | No Smoothing | 2 |
| 6 | 4 | 4 | 4 | 0 | 0 | 0 | 0 | 1 | 1 | No Smoothing | 1 |
| 7 | 4 | 4 | 4 | 0 | 0 | 0 | 0 | 1 | 1 | No Smoothing | 1 |
| 8 | 4 | 4 | 4 | 0 | 0 | 0 | 0 | 1 | 1 | No Smoothing | 1 |
| 9 | 4 | 4 | 4 | 0 | 0 | 0 | 0 | 1 | 1 | No Smoothing | 0 |

FIG. 8D

Font Type: True Type Sub Pixel Rendering

| Scaled Stem Width (1/6ths) | X Grid Ratio | Y Grid Ratio | Hint Grid Ratio | X Align. | Y Align. | X Offset Amt. | Y Offset Amt. | X Carry (y/n) | Y Carry (y/n) | Hinting Policy | Initial Adjustment Value (1/6ths) |
|---|---|---|---|---|---|---|---|---|---|---|---|
| 0 | 6 | 6 | 6 | 0 | 0 | 0 | 0 | 1 | 1 | No Smoothing | 3 |
| 1 | 6 | 6 | 6 | 0 | 0 | 0 | 0 | 1 | 1 | No Smoothing | 3 |
| 2 | 6 | 6 | 6 | 0 | 0 | 0 | 0 | 1 | 1 | No Smoothing | 3 |
| 3 | 6 | 6 | 6 | 0 | 0 | 0 | 0 | 1 | 1 | No Smoothing | 3 |
| 4 | 6 | 6 | 6 | 0 | 0 | 0 | 0 | 1 | 1 | No Smoothing | 3 |
| 5 | 6 | 6 | 6 | 0 | 0 | 0 | 0 | 1 | 1 | No Smoothing | 2 |
| 6 | 6 | 6 | 6 | 0 | 0 | 0 | 0 | 1 | 1 | No Smoothing | 2 |
| 7 | 6 | 6 | 6 | 0 | 0 | 0 | 0 | 1 | 1 | No Smoothing | 2 |
| 8 | 6 | 6 | 6 | 0 | 0 | 0 | 0 | 1 | 1 | No Smoothing | 2 |
| 9 | 6 | 6 | 6 | 0 | 0 | 0 | 0 | 1 | 1 | No Smoothing | 2 |
| 10 | 6 | 6 | 6 | 0 | 0 | 0 | 0 | 1 | 1 | No Smoothing | 2 |
| 11 | 6 | 6 | 6 | 0 | 0 | 0 | 0 | 1 | 1 | No Smoothing | 1 |
| 12 | 6 | 6 | 6 | 0 | 0 | 0 | 0 | 1 | 1 | No Smoothing | 1 |
| 13 | 6 | 6 | 6 | 0 | 0 | 0 | 0 | 1 | 1 | No Smoothing | 0 |

FIG. 8E 830 832 Font Type: True Type Gray Scale

| Scaled Stem Width (1/8ths) | X Grid Ratio | Y Grid Ratio | Hint Grid Ratio | X Align. | Y Align. | X Offset Amt. | Y Offset Amt. | X Carry (y/n) | Y Carry (y/n) | Hinting Policy | Initial Adjustment Value (1/8ths) |
|---|---|---|---|---|---|---|---|---|---|---|---|
| 0 | 8 | 2 | 8 | 1 | 4 | 0 | 0 | 1 | 0 | Anisotropic | 3 |
| 1 | 8 | 2 | 8 | 1 | 4 | 0 | 0 | 1 | 0 | Anisotropic | 3 |
| 2 | 8 | 2 | 8 | 1 | 4 | 0 | 0 | 1 | 0 | Anisotropic | 3 |
| 3 | 8 | 2 | 8 | 1 | 4 | 0 | 0 | 1 | 0 | Anisotropic | 3 |
| 4 | 8 | 2 | 8 | 1 | 4 | 0 | 0 | 1 | 0 | Anisotropic | 3 |
| 5 | 8 | 2 | 8 | 1 | 4 | 0 | 0 | 1 | 0 | Anisotropic | 2 |
| 6 | 8 | 2 | 8 | 1 | 4 | 0 | 0 | 1 | 0 | Anisotropic | 2 |
| 7 | 8 | 2 | 8 | 1 | 4 | 0 | 0 | 1 | 0 | Anisotropic | 2 |
| 8 | 8 | 2 | 8 | 1 | 4 | 0 | 0 | 1 | 0 | Anisotropic | 2 |
| 9 | 8 | 2 | 8 | 1 | 4 | 0 | 0 | 1 | 0 | Anisotropic | 2 |
| 10 | 8 | 2 | 8 | 1 | 4 | 0 | 0 | 1 | 0 | Anisotropic | 2 |
| 11 | 8 | 2 | 8 | 1 | 4 | 0 | 0 | 1 | 0 | Anisotropic | 1 |
| 12 | 8 | 2 | 8 | 1 | 4 | 0 | 0 | 1 | 0 | Anisotropic | 1 |
| 13 | 8 | 2 | 8 | 1 | 4 | 0 | 0 | 1 | 0 | Anisotropic | 1 |
| 14 | 8 | 2 | 8 | 1 | 4 | 0 | 0 | 1 | 0 | Anisotropic | 1 |
| 15 | 8 | 2 | 8 | 1 | 4 | 0 | 0 | 1 | 0 | Anisotropic | 1 |
| 16 | 8 | 2 | 8 | 1 | 4 | 0 | 0 | 1 | 0 | Anisotropic | 1 |
| 17 | 8 | 2 | 8 | 1 | 4 | 0 | 0 | 1 | 0 | Anisotropic | 1 |
| 18 | 8 | 2 | 8 | 1 | 4 | 0 | 0 | 1 | 0 | Anisotropic | 0 |

FIG. 8F

Font Type: True Type Sub Pixel Rendering

| Scaled Stem Width (1/6ths) | X Grid Ratio | Y Grid Ratio | Hint Grid Ratio | X Align. | Y Align. | X Offset Amt. | Y Offset Amt. | X Carry (y/n) | Y Carry (y/n) | Hinting Policy | Initial Adjustment Value (1/6ths) |
|---|---|---|---|---|---|---|---|---|---|---|---|
| 0 | 6 | 6 | 6 | 1 | 6 | 0 | 0 | 1 | 0 | Anisotropic | 3 |
| 1 | 6 | 6 | 6 | 1 | 6 | 0 | 0 | 1 | 0 | Anisotropic | 3 |
| 2 | 6 | 6 | 6 | 1 | 6 | 0 | 0 | 1 | 0 | Anisotropic | 3 |
| 3 | 6 | 6 | 6 | 1 | 6 | 0 | 0 | 1 | 0 | Anisotropic | 3 |
| 4 | 6 | 6 | 6 | 1 | 6 | 0 | 0 | 1 | 0 | Anisotropic | 3 |
| 5 | 6 | 6 | 6 | 1 | 6 | 0 | 0 | 1 | 0 | Anisotropic | 2 |
| 6 | 6 | 6 | 6 | 1 | 6 | 0 | 0 | 1 | 0 | Anisotropic | 2 |
| 7 | 6 | 6 | 6 | 1 | 6 | 0 | 0 | 1 | 0 | Anisotropic | 2 |
| 8 | 6 | 6 | 6 | 1 | 6 | 0 | 0 | 1 | 0 | Anisotropic | 2 |
| 9 | 6 | 6 | 6 | 1 | 6 | 0 | 0 | 1 | 0 | Anisotropic | 2 |
| 10 | 6 | 6 | 6 | 1 | 6 | 0 | 0 | 1 | 0 | Anisotropic | 2 |
| 11 | 6 | 6 | 6 | 1 | 6 | 0 | 0 | 1 | 0 | Anisotropic | 1 |
| 12 | 6 | 6 | 6 | 1 | 6 | 0 | 0 | 1 | 0 | Anisotropic | 1 |
| 13 | 6 | 6 | 6 | 1 | 6 | 0 | 0 | 1 | 0 | Anisotropic | 0 |

FIG. 8G

| 10 | 16 | 16 | 16 | 16 | 16 | 16 | 11 | 2 |   |
|----|----|----|----|----|----|----|----|----|----|
| 10 | 12 |    |    |    |    | 2  | 13 | 14 |   |
| 10 | 12 |    |    |    |    | 3  | 16 | 5  |   |
| 10 | 12 |    |    |    |    | 2  | 16 | 6  |   |
| 10 | 12 |    |    |    |    | 4  | 16 | 5  |   |
| 10 | 12 |    |    |    |    | 3  | 14 | 13 |   |
| 10 | 16 | 16 | 16 | 16 | 16 | 16 | 10 | 1  |   |
| 10 | 12 |    | 2  | 13 | 13 | 3  |    |    |   |
| 10 | 12 |    | 1  | 14 | 14 | 2  |    |    |   |
| 10 | 12 |    |    | 4  | 16 | 11 |    |    |   |
| 10 | 12 |    |    | 9  | 16 | 6  |    |    |   |
| 10 | 12 |    |    | 1  | 14 | 15 | 2  |    |   |

1120

1120

| 11 | 16 | 16 | 16 | 16 | 16 | 16 | 12 | 2  |    |
|----|----|----|----|----|----|----|----|----|----|
| 11 | 13 |    |    |    |    | 2  | 13 | 14 |    |
| 11 | 13 |    |    |    |    |    | 4  | 16 | 6  |
| 11 | 13 |    |    |    |    |    | 3  | 16 | 7  |
| 11 | 13 |    |    |    |    |    | 5  | 16 | 6  |
| 11 | 13 |    |    |    |    | 3  | 14 | 13 |    |
| 11 | 16 | 16 | 16 | 16 | 16 | 16 | 11 | 1  |    |
| 11 | 13 |    |    | 2  | 13 | 13 | 3  |    |    |
| 11 | 13 |    |    | 1  | 14 | 14 | 2  |    |    |
| 11 | 13 |    | 1120 | 5 | 16 | 12 |    |    |    |
| 11 | 13 |    |    |    | 10 | 16 | 7  |    |    |
| 11 | 13 |    |    |    | 1  | 14 | 15 | 2  |    |

1210 1215 1205

| Scaled Stem Width (16ths) | Grid Ratio | Alignment Offset | Darkening Amount (16ths Per Side) | Asymmetric Darkening | | | | Phase Difference | Rasterized Stem Width (Bold Lines) and Darkening Amount (Light Lines), Showing Both Phases |
|---|---|---|---|---|---|---|---|---|---|
| | | | | Low Density | Low Density Darkening Amount (16ths) | High Density | High Density Darkening Amount (16ths) | | |
| 1-4 | 4 | 0 | 4 | | | | | 1/4 | |
| 5,6 | 8 | 0 | 4 | 0 | 2 | 24 | 6 | 3/8 | |
| 7,8 | 8 | 0 | 4 | 0 | 2 | 32 | 6 | 1/4 | |
| 9,10 | 8 | 0 | 4 | 0 | 2 | 40 | 6 | 1/8 | |
| 11,12 | 4 | 1 | 4 | | | | | 1/4 | |
| 13,14 | 8 | 1 | 3 | 0 | 4 | 56 | 2 | 1/4 | |
| 15,16 | 8 | 1 | 3 | 8 | 4 | 56 | 2 | 3/8 | |
| 17,18 | 8 | 1 | 2 | | | | | 3/8 | |
| 19,20 | 8 | 1 | 2 | | | | | 1/2 | |
| 21,22 | 8 | 1 | 2 | | | | | 3/8 | |
| 23,24 | 8 | 1 | 2 | | | | | 1/4 | |
| 25 | 8 | 1 | 2 | | | | | 1/8 | |
| 26-28 | 4 | 0 | 1 | 0 | 0 | 12 | 2 | 1/8 | |
| 29,30 | 8 | 1 | 1 | 0 | 2 | 56 | 0 | 1/8 | |
| 31,32 | 8 | 1 | 1 | 8 | 0 | 56 | 2 | 1/8 | |
| 33 | 8 | 1 | 1 | 16 | 0 | 56 | 2 | 1/4 | |
| 34-37 | 4 | 0 | 0 | | | | | 1/4 | |

ADJUSTED STROKE RENDERING

BACKGROUND OF INVENTION

The present invention relates to rendering strokes including glyphs formed from one or more strokes.

A character is an abstract construct that often represents an atomic unit in some system of expression, such as a language. Each character can be represented by a set of character attributes that define the semantic information of the character. A character encoding associates the set of character attributes for a character with a particular encoding value—for example, a scalar value included in a character set standard, such as ASCII (American Standard Code for Information Interchanges) or Unicode.

A glyph is a visual representation of a character, such as a graphical token or symbol, and includes one or more strokes, which may be vertical or horizontal (sometimes referred to as vertical and horizontal stems), curved or angled. A glyph image is a particular image of a glyph that has been rasterized or otherwise imaged onto some display surface. A font is a collection of glyphs, and can include a mapping of the collection of glyphs to corresponding characters (i.e., to encoding values). A font is typically constructed to support a character set standard. That is, fonts include glyphs representing characters included in the character set standard. A glyph can be associated with a set of glyph attributes defining appearance information for a representation of the corresponding character, and the glyph provides the information necessary to render a corresponding glyph image. A glyph can include, or can be associated with, a set of instructions for rendering the glyph. For example, TrueType™ fonts, available from Microsoft Corporation of Redmond, Wash., include glyphs that are associated with a set of instructions for use when rendering the glyph.

Hinting is a method of defining which pixels are turned on in order to create the best possible glyph bitmap shape, particularly at small sizes and low resolutions. A glyph's outline determines which pixels will constitute the bitmap. It is often necessary to modify the outline to create the bitmap, i.e., modify the outline until the desired combination of pixels is turned on. The modified outline can be referred to as a hinted outline. In certain fonts, such as TrueType fonts, a hint is a mathematical instruction that is included in the font program that defines a distortion of a glyph's outline at particular sizes. In other fonts, such as Type 1 fonts available from Adobe Systems Incorporated ("Adobe") of San Jose, Calif., a glyph outline may be hinted according to various hinting policies. Hinting of Type 1 fonts is described in Section 5 of a manual entitled "Adobe Type 1 Format", Version 1.1 available from Adobe. The term "Type 1" as used herein includes font/glyph definitions that are derived from or an enhancement of the Adobe Type 1 font format.

Certain types of visual output devices for computer systems are capable of outputting in "gray scale". That is, each of the pixels in the raster matrix of the output device is capable of displaying a number of tones, typically from pure light to pure dark (which may or may not be shades of gray, per se). Anti-aliasing is a technique of varying the gray scale or color values of the pixels representing a glyph image to provide the illusion of smoother curves and less jagged diagonal lines.

Referring to FIGS. 1 and 2, an anti-aliasing technique can downsample a high resolution bitmap 105 to generate a gray scale representation 205 of a glyph image, the gray scale representation having varying tones of gray. For example, the ratio of the high resolution of the bitmap to the device resolution can be 4 to 1 in both x and y directions, illustrated by the grid 110 shown in FIG. 1, which grid corresponds to the device resolution. The device resolution is the maximum number of individual pixels that can be displayed on the computer output device used to display the corresponding glyph image, and may be expressed as "dots per inch", e.g., 96 dpi.

Before digital typography and scalable type, a font typically had a unique design for each glyph at each size. While the designs at different sizes were similar, important differences existed. As the size of a glyph became smaller, the relative size of the stems increased and the relative spacing between glyphs increased. These differences can be collectively referred to as optical compensation. However, with the advent of digital typography and the implications of "what you see is what you get" (WYSIWYG) and linear scaling, the optical size refinement in type design was largely lost. There are exceptions. For example, Multiple-Master fonts available from Adobe may have an optical size axis, or an individual type design can be implemented for different design sizes. However, even these techniques do not work well for final form documents that may be displayed at different zoom levels.

FIG. 3 A shows this effect by comparing two variants of the letter "R" from the Type 1 SanvitoMM font. The SanvitoMM font contains four designs: a light 6 point design, a bold 6 point design, a light 72 point design and a bold 72 point design. The dotted outline 300 represents a glyph outline using the SanvitoMM light 6 point design, and the solid outline 305 represents a glyph outline using the SanvitoMM light 72 point design. For illustrative purposes, the outlines 300, 305 have been scaled to a common size so that the relative differences are more easily compared and have a common origin 310. The glyph outline 305 rendered at the 72 point size is positioned to the left (relative to the outline 300 ) and has a relatively smaller advance width 315 than the advance width 320 of the glyph outline 300 rendered at the 6 point size. The glyph outline 300 intended for the smaller point size has a relatively larger overall width and wider strokes. FIG. 3B shows the same two glyph outlines 300, 305 with their origins adjusted so that just the outline design differences may more easily be compared.

If, rather than drawing the glyph outline 300 using the SanvitoMM light 6 point design, the glyph outline 305 drawn using the SanvitoMM light 72 point design is scaled down to a 6 point size, the relative overall width will not be relatively larger nor will the strokes be relatively wider than the glyph outline drawn at 72 point size (because it is the same glyph outline). That is, the strokes will be too narrow (relatively speaking) when scaled down to a 6 point size. When applying conventional anti-aliasing techniques to such narrow strokes, the strokes tend to fade, which can adversely affect readability of the resulting displayed glyph. Adjustment techniques have been used to counter fading, such as an adjustment technique described in U.S. Pat. No. 5,929,866 to R. David Arnold entitled "Adjusting Contrast in Anti-Aliasing". Arnold describes a technique for adjusting the density values of pixels representing a glyph up to the maximum density value available from the output device.

SUMMARY

The present invention provides methods and apparatus, including computer program products, for rendering strokes includes glyphs formed from one or more strokes. In general, in one aspect, the invention features a method of rendering a glyph to make the glyph more readable. The method includes receiving a glyph associated with a font, the glyph to be rendered at a size. A set of initial density values is calculated to provide one density value for each of a set of device pixels to represent the glyph, and an initial adjustment value is calculated for the glyph. For one or more of the device pixels in the set of device pixels, a length of an edge of the glyph that passes through the device pixel is calculated. For one or more of the device pixels, the initial density value is adjusted by a final adjustment value, the final adjustment value based upon the initial adjustment value and the length of the edge of the glyph passing through the device pixel.

Implementations may include one or more of the following. Calculating an initial adjustment value can include determining a standard stem width for the font, calculating a scaled stem width from the standard stem width and the size, and determining an initial adjustment value based on the scaled stem width. Alternatively, calculating an initial adjustment value can include determining a horizontal standard stem width and a vertical standard stem width for the font, calculating a horizontal scaled stem width from the horizontal standard stem width and the size, and calculating a vertical scaled stem width from the vertical standard stem width and the size. A horizontal initial adjustment value is determined based on the horizontal scaled stem width, and a vertical initial adjustment value is determined based on the vertical scaled stem width. The final adjustment value can be based upon the horizontal initial adjustment value, the vertical initial adjustment and the length of the edge of the glyph passing through the device pixel.

If a stroke of a glyph is to be asymmetrically adjusted, then calculating an initial adjustment value can include determining a standard stem width for the font, calculating a scaled stem width from the standard stem width and the size, and determining an initial adjustment value for a subset of device pixels forming an edge of the stroke based on the scaled stem width and the initial density values of the subset of device pixels.

Calculating a length of an edge of the glyph that passes through the device pixel can include rendering a high resolution bitmap representation of the glyph, the bitmap being representative of the initial density values, and identifying initial adjustment pixels along the edges of the high resolution bitmap representation of the glyph. The initial adjustment pixels can be high resolution pixels representative of the initial adjustment value of the glyph, wherein the length of the edge of the glyph that passes through a device pixel is a ratio of the number of initial adjustment pixels in a direction to a grid ratio in a corresponding direction. If the glyph is to be rendered without carrying adjustment in a y direction, then initial adjustment pixels are not identified along an edge of the high resolution bitmap that coincides with a device pixel boundary in the y direction.

Identifying initial adjustment pixels along the edges of the high resolution bitmap can include identifying initial adjustment pixels in a neighboring device pixel to a device pixel having an initial density value equal to a maximum density value, where the neighboring device pixel has an initial density value of zero.

The method can further include calculating a length of an edge of the glyph that passes through a neighboring device pixel, and adjusting the initial density value of the neighboring device pixel by a final adjustment value, the final adjustment value based on the initial adjustment value and the length of the edge passing through the neighboring device pixel. The font can be, for example, a Type 1 or TrueType font.

In general, in another aspect, the invention features a method of rendering a stroke. The method includes receiving a path representing a stroke to be rendered at a given stroke width, and calculating a set of initial density values to provide one density value for each of a set of device pixels to represent the stroke. An initial adjustment value for the stroke is calculated, and for one or more of the device pixels in the set of device pixels, a length of an edge of the stroke that passes through the device pixel is calculated. For one or more of the device pixels, the initial density value is adjusted by a final adjustment value, the final adjustment value based upon the initial adjustment value and the length of the edge of the stroke passing through the device pixel.

In general, in another aspect, the invention features a computer-implemented method, including the steps of receiving a plurality of glyphs to be rendered, and for each glyph, before rasterizing a representation of the glyph, using a scaled stem width of the glyph to select a rendering policy for rendering the glyph.

In one implementation, wherein a rendered glyph is represented by a plurality of device pixels, selecting a rendering policy can include selecting an initial adjustment value for adjusting density values of one or more of the plurality of device pixels.

In general, in another aspect, the invention features a method of rendering a glyph to make the glyph more readable. A glyph to be rendered is received, the glyph associated with a font and to be rendered at a size. The glyph includes one or more strokes, including one or more horizontal and/or vertical strokes. An initial adjustment value is calculated for the glyph. An offset amount is calculated based on the initial adjustment value, such that a minimum number of device pixels will be marked by the one or more horizontal and/or vertical strokes after adjusting the density values of one or more device pixels representing the glyph. A high resolution representation of the glyph is rendered so that one or more edges of at least one stroke is offset from a device resolution grid by the offset amount. The high resolution representation represents a set of device pixels each having an initial density value. For one or more of the device pixels in the set of device pixels, a length of an edge of a stroke that passes through the device pixel is calculated. The density values of the one or more device pixels are adjusted by a final adjustment value based on the initial adjustment value and the length of an edge of a stroke passing through the device pixel.

Implementations can include one or more of the following. The offset amount can be equal to or greater than the initial adjustment value. Calculating an initial adjustment value can include determining a standard stem width for the font, calculating a scaled stem width from the standard stem width and the size, and determining an initial adjustment value based on the scaled stem width. The method can further include determining a second offset amount, wherein the rendering step includes rendering the glyph so that edges of the one or more strokes are offset from the device resolution grid in a first direction by the offset amount and offset from the device resolution grid in a second direction by the second offset amount. The high resolution representation of the glyph can be a high resolution bitmap. Calculating a length of an edge of a stroke that passes through a device pixel can include identifying initial adjustment pixels along the edges of the high resolution bitmap representation of the glyph, the initial adjustment pixels being high resolution pixels representative of the initial adjustment value. The length of the edge of a stroke that passes through a device pixel is a ratio of the number of initial adjustment pixels in a direction to a grid ratio in the corresponding direction. The font can be a Type 1 font or a TrueType font, for example.

In general, in another aspect, the invention features a method of rendering a stroke. The method includes receiving a path representing a stroke, the stroke to be rendered at a size, and calculating an initial adjustment value for the stroke. An offset amount is calculated based on the initial adjustment value such that a minimum number of device pixels will be marked by the stroke after adjusting density values of one or more device pixels representing the stroke. A high resolution representation of the stroke is rendered so that one or more edges of the stroke is offset from a device resolution grid by the offset amount, the high resolution representation including a set of device pixels each having an initial density value. For one or more of the device pixels in the set of device pixels, a length of an edge of the stroke that passes through the device pixel is calculated. The density values of the one or more device pixels are adjusted by a final adjustment value based on the initial adjustment value and the length of an edge of the stroke passing through the device pixel.

The invention can be implemented to realize one or more of the following advantages. At small sizes, the appearance of a glyph or a stroke (e.g., a line) can be adjusted to improve the contrast between the glyph or stroke and a background against which the glyph or stroke is displayed. With respect to glyphs, this can improve readability. The density value of pixels representing the glyph or stroke can be adjusted even if an original density value is a maximum density value and the adjustments will carry over into neighboring pixels. Pre-adjustment, a glyph or stroke can be rendered offset from a device resolution grid such that the adjusted representation of the glyph or stroke benefits from adjustment without losing the benefits of hinting. Improved consistency can be achieved in the behavior among all glyphs of a font and size, font family members (e.g., a regular font and a bold font), and text rendered at different sizes. Distinct phases for strokes comprising a glyph image can be preserved.

The details of one or more embodiments of the invention are set forth in the accompanying drawings and the description below. Other features and advantages of the invention will be apparent from the description, the drawings, and the claims.

DESCRIPTION OF DRAWINGS

FIGS. 8A–G show look-up tables for initial adjustment values.

Like reference symbols in the various drawings indicate like elements.

DETAILED DESCRIPTION

Glyph rendering at smaller sizes may be improved by adjusting the density values of device pixels used to represent the glyph on an output device (e.g., a computer monitor). The term "density value" can refer to an alpha value in the range of 0 to 1 representing the percentage of a device pixel that is a text color as compared to a background color, where 0 represents fully transparent (i.e., no text color) and 1 represents fully opaque (i.e., all text color). Typically the density value is adjusted to increase the density, and may be referred to as "darkening". For example, in the case of a gray scale representation in shades of black against a white background, an increased pixel density results in the appearance of a darker pixel. Conventional darkening techniques cannot darken a pixel that already has a maximum density value (e.g., a black pixel in a gray scale representation). For example, if a glyph is displayed in gray scale at a certain point size and includes a stem that is an integral number of maximum intensity device pixels wide (i.e., a black stem), then using conventional darkening techniques, the pixels forming the stem cannot be darkened (because they are already of maximum density). That will make the character less readable.

The methods and systems described herein allow the appearance of strokes forming a glyph image to be adjusted whether or not an unadjusted stroke is formed of maximum density pixels. The appearance of a stroke is adjusted based on detection of the edges of the stroke, and an adjustment of a pixel's density value can carry over into a neighboring pixel if the pixel's unadjusted density value is at maximum.

In a hinting process, it may be important to be able to place a stroke (e.g. a vertical stem) in more than one position, the positions differing from one another by less than one device pixel, to improve interglyph spacing and reduce glyph distortion. The different positions can be referred to as "phases". The methods and systems described herein can also preserve phase differences at various sizes.

Figure 1:
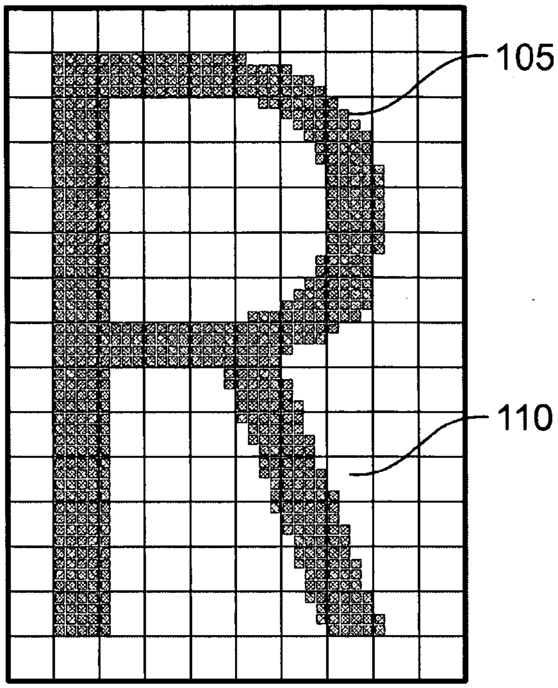
FIG. 1 shows a high resolution bitmap representation of a glyph representing the character R.
Figure 2:
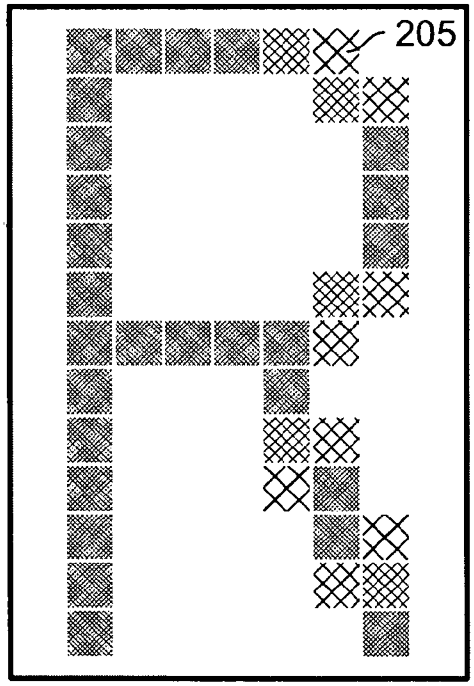
FIG. 2 shows a gray scale representation of a glyph representing the character R.
Figure 3A:
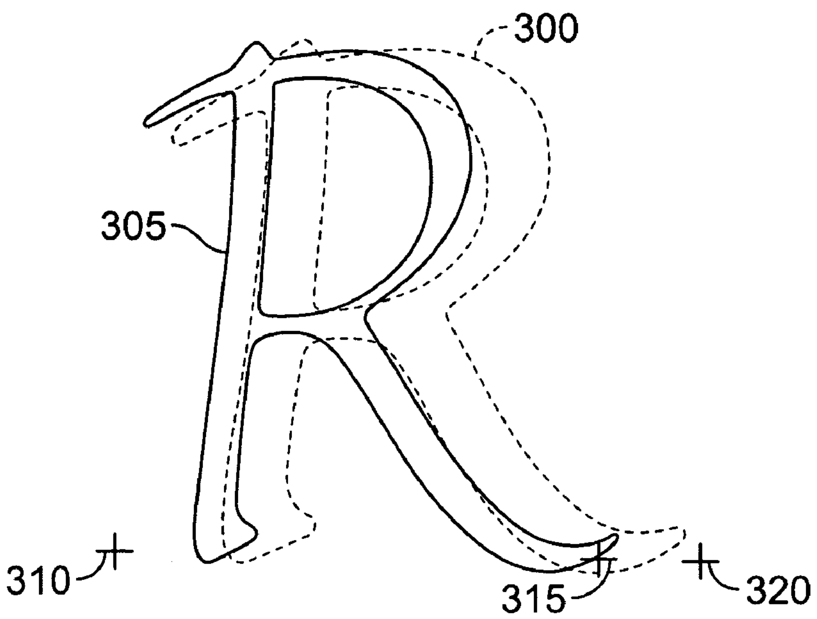
FIGS. 3A and 3B show glyph outlines representing the character R.
Figure 3B:
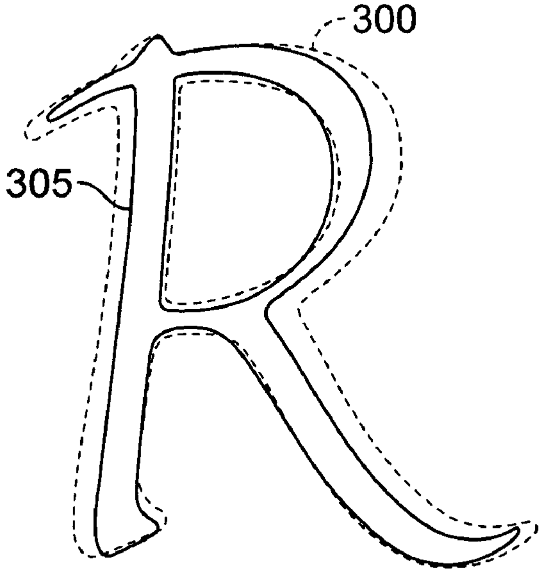
Figure 4A:
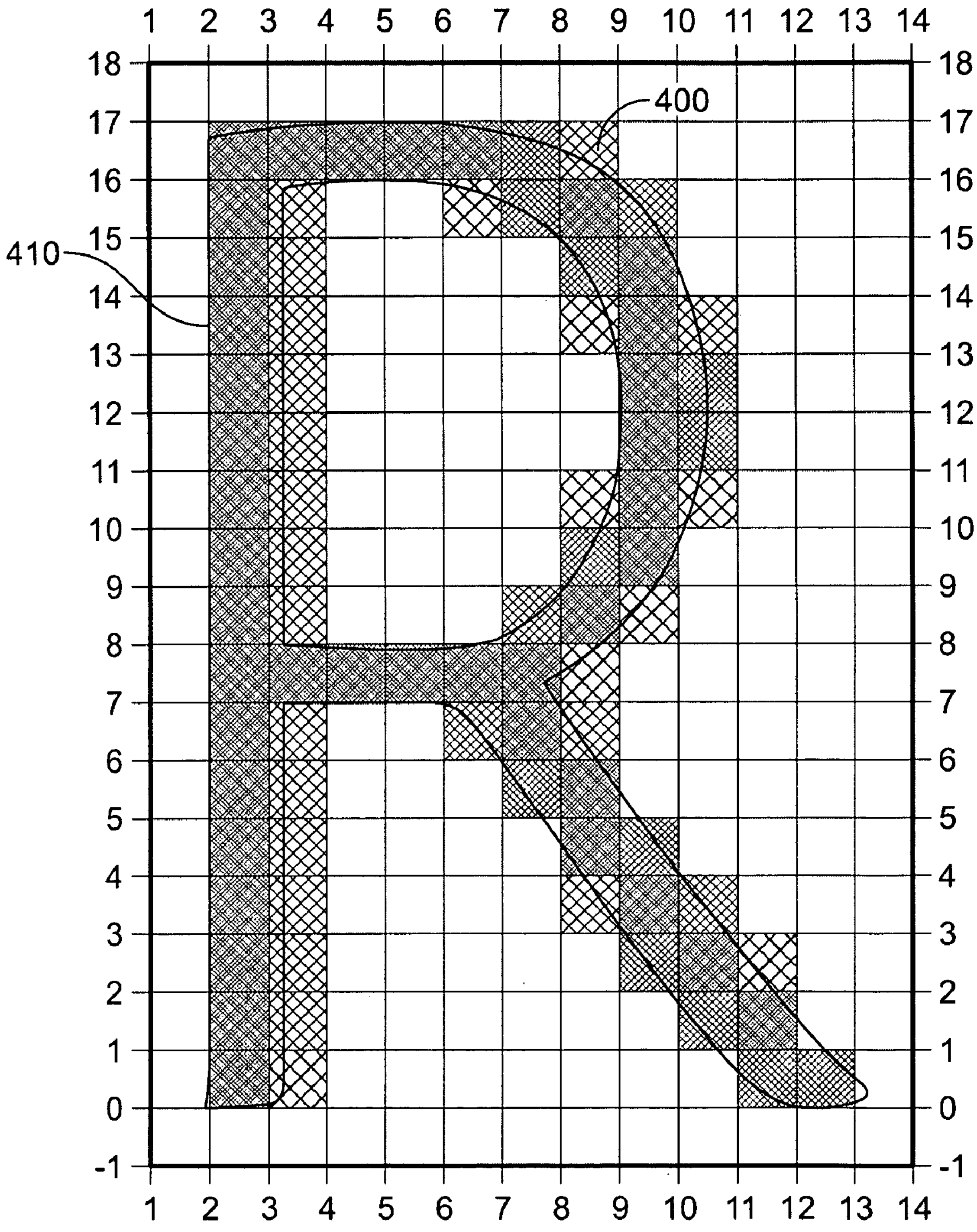
FIG. 4A shows an unadjusted gray scale representation of a glyph representing the character R.
Figure 4B:
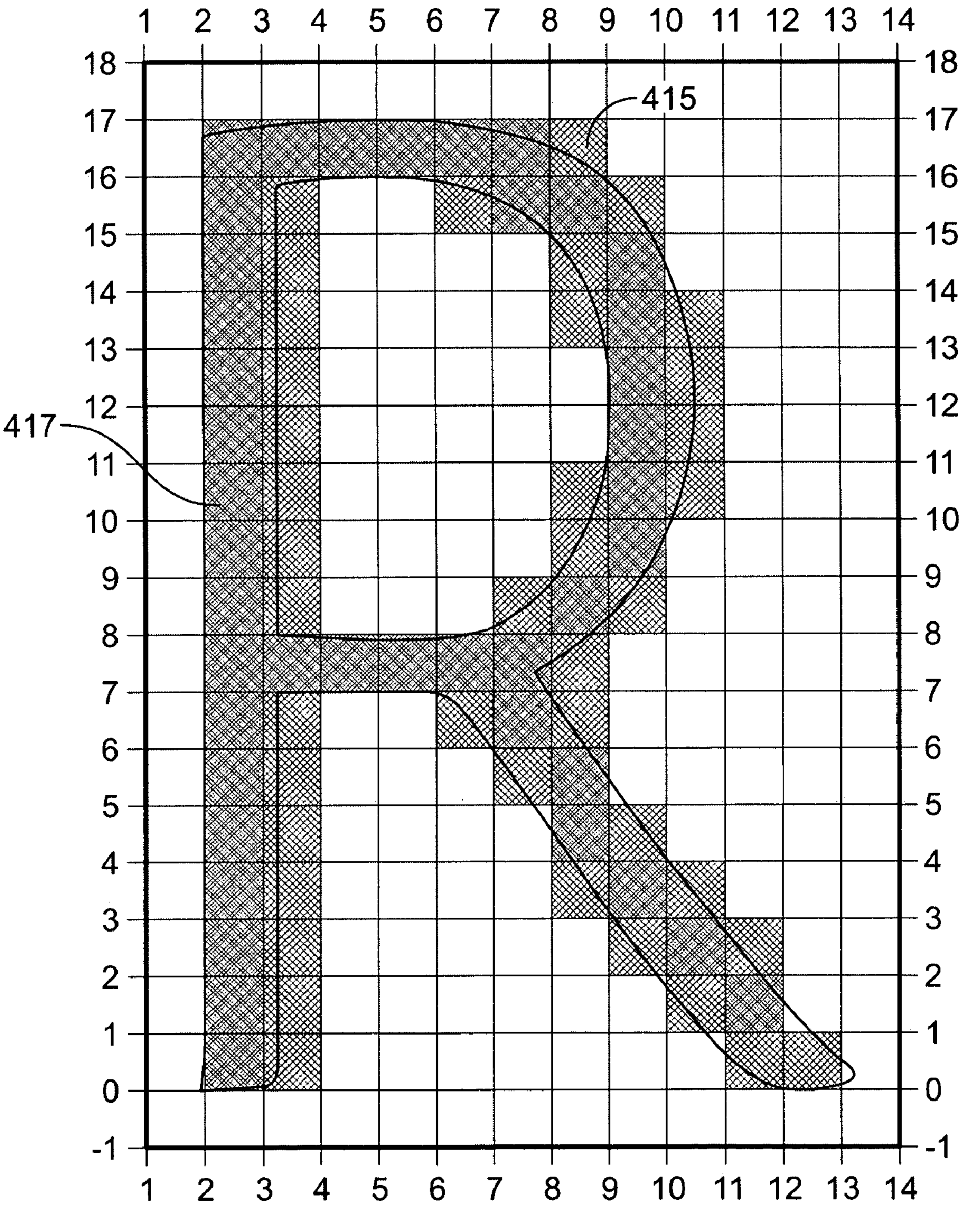
FIGS. 4B and 4C show adjusted versions of the gray scale representation of FIG. 4A.
Figure 4C:
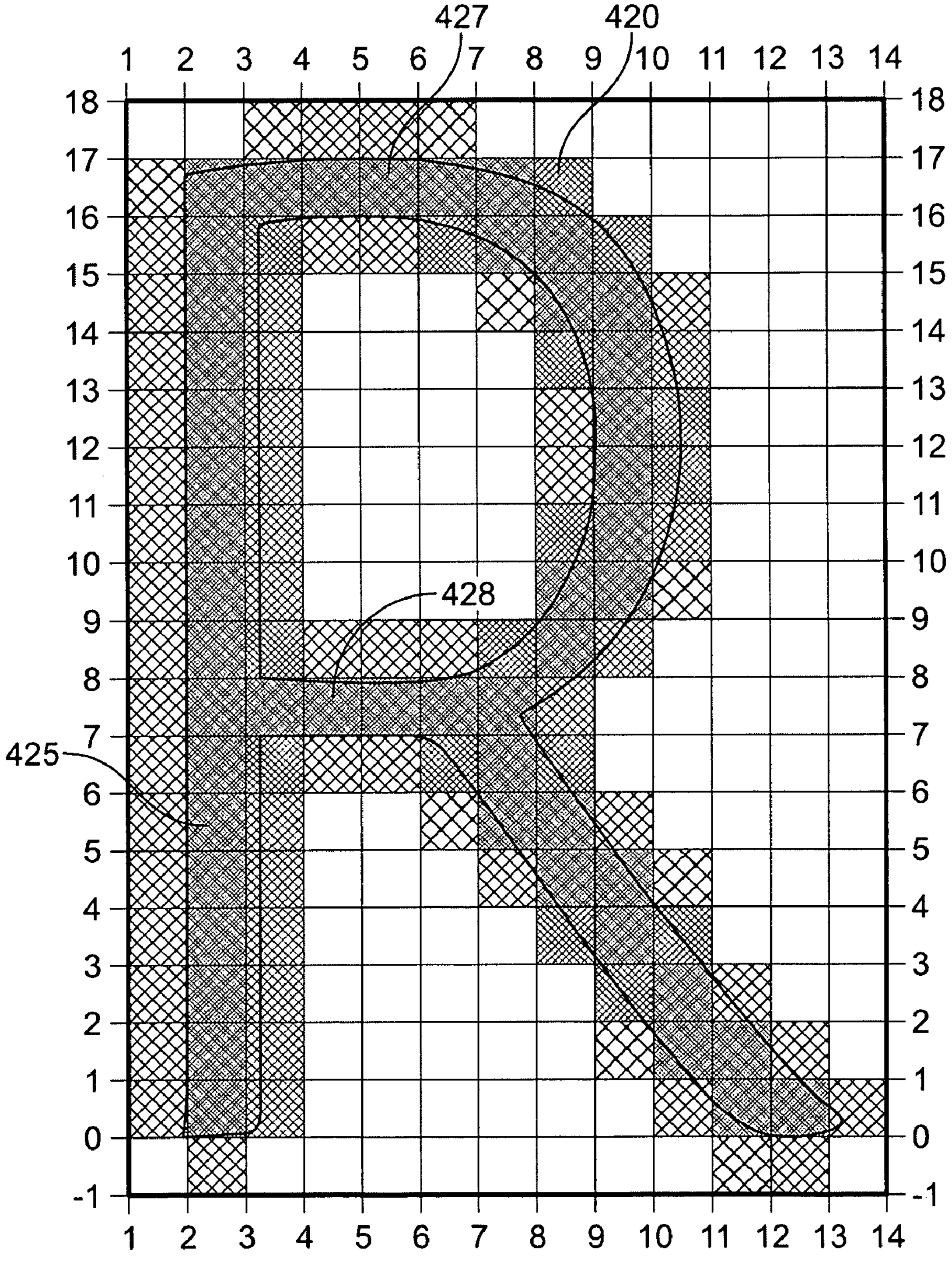

FIG. 4A shows an unadjusted gray scale representation 400 of a glyph corresponding to the character "R". The vertical stem 410 is a combination of a first column of maximum intensity (i.e., black) pixels and a second column of less than maximum intensity (i.e., gray) pixels. FIG. 4B shows the gray scale representation of FIG. 4A adjusted according to conventional techniques to darken the intensity of the gray pixels. The black pixels in the first column cannot be darkened as the density value is already the maximum permitted by the device. In FIG. 4B, the stems and strokes appear darker, but the number of device pixels marked is not increased. By contrast, an adjusted gray scale representation 420 is shown in FIG. 4C. This is the gray scale representation of FIG. 4A with the density values adjusted based on edge detection. In some instances the adjustment carries over into a neighboring pixel. For example, in FIG. 4C the vertical stem 425 is three device pixels wide as compared to the vertical stems 410 and 417 shown in FIGS. 4A and 4B, which are two device pixels wide. In FIG. 4C, the horizontal stems across the top 427 and middle 428 of the "R" increased from one pixel wide in FIGS. 4A and 4B to three pixels wide.

Figure 5:
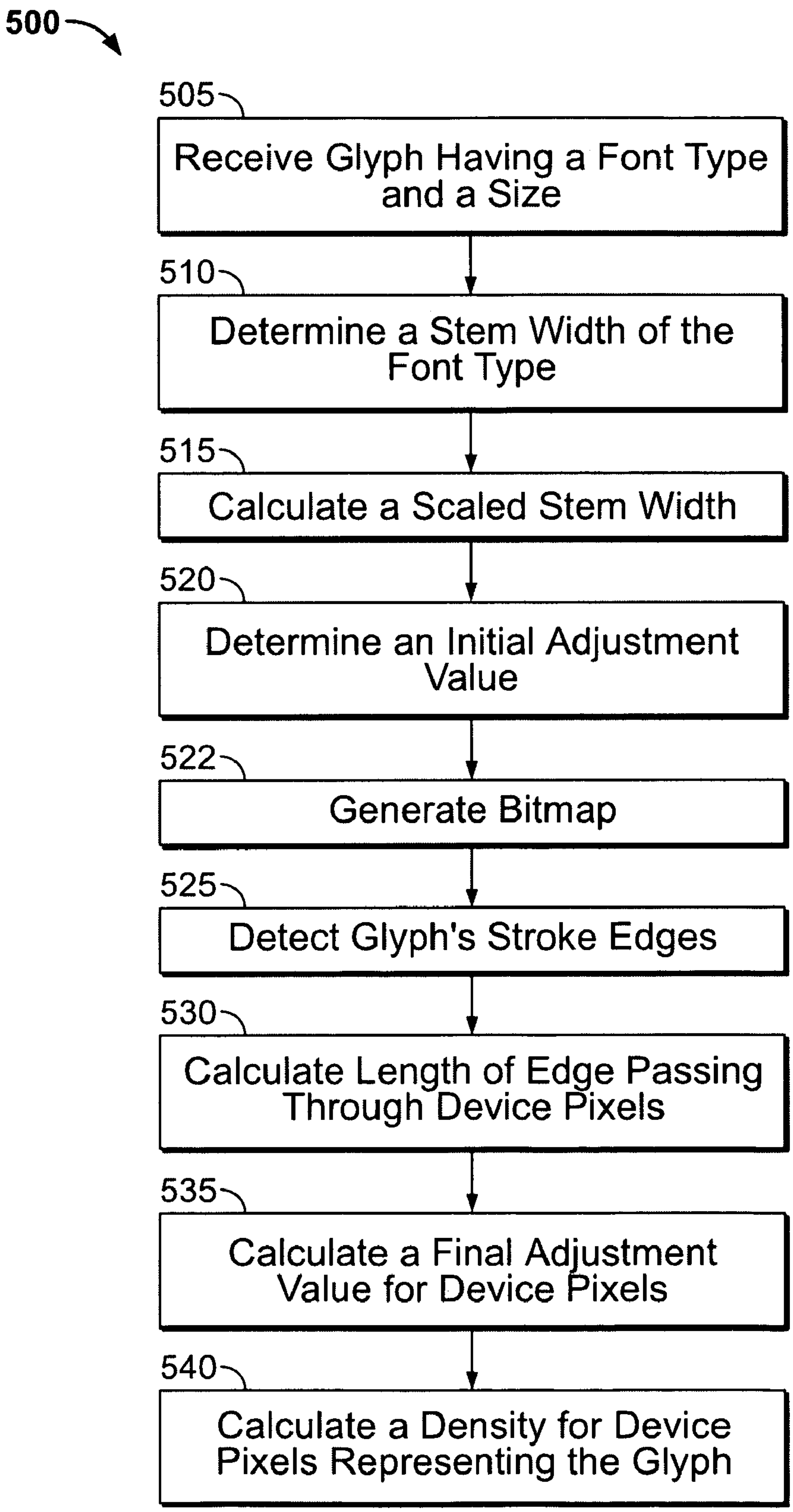
FIG. 5 is a flowchart showing a process for calculating final adjustment values for pixel densities representing a glyph.

FIG. 5 shows a process 500 for adjusting the density values of device pixels representing an image of a glyph based on edge detection, which can be used, for example, to adjust the gray scale representation 400 shown in FIG. 4A to the adjusted gray scale representation 420 shown in FIG. 4C. In a first step, a glyph to be rendered at a given size (step 505) belonging to a font is received by a renderer. For example, a glyph such as the glyph represented by the high resolution bitmap 605 shown in FIG. 6A may be received. The glyph corresponds to the character "R" in the Adobe Type 1 font CronosMM at a point size of 26 pixels per em. The bitmap 605 is shown on a fine grid having a ratio of 4×4 compared to the device resolution of an output device that will display the rendered glyph (i.e., 4 fine pixels in the x and y directions per one device pixel). The coarse grid 620 represents the device resolution.

The left edge 610 of the vertical stem 615 is aligned to the coarse grid 620, which suggests that the glyph outline used to generate the bitmap 605 was hinted to align the edge 610 to the coarse grid 620 before scan conversion. The bitmap 605 can be downsampled to render a gray scale representation 625 of the glyph, as shown in FIG. 6B.

Typically, a font defines a standard stem width that applies to all glyphs within the font. The standard stem width usually refers to a vertical standard stem width, although a horizontal stem width may also be defined by the font. A standard stem width, or an approximated standard stem width, can be determined in a number of ways, depending on the available information. In one implementation, the font dictionary can be queried for the standard stem width. Alternatively, a representative glyph, for example, a lower case "1", can be rasterized and the stem width measured. As another alternative, a default value, e.g., $^{75}/_{1000}$, can be used as an approximate standard stem width. In some instances, a value of a standard stem width may be supplied by an electronic document to be rendered, for example, a PDF font descriptor.

In this example, the Type 1 CronosMM font (step 510) is used. A scaled stem width is calculated by scaling the font's standard stem width to the size at which the glyph is to be rendered (step 515). In this example, the font has as a standard stem width of $^{46}/_{1000}$ and the glyph is to be rendered at a size of 26 pixels per em. The scaled stem width can be calculated by multiplying the standard stem width by the size, i.e., $^{46}/_{1000}$* 26 =1.196, which may be rounded to the nearest ¼ pixel, and therefore the scaled stem width for the glyph is 1.25 device pixels.

Figure 7A:
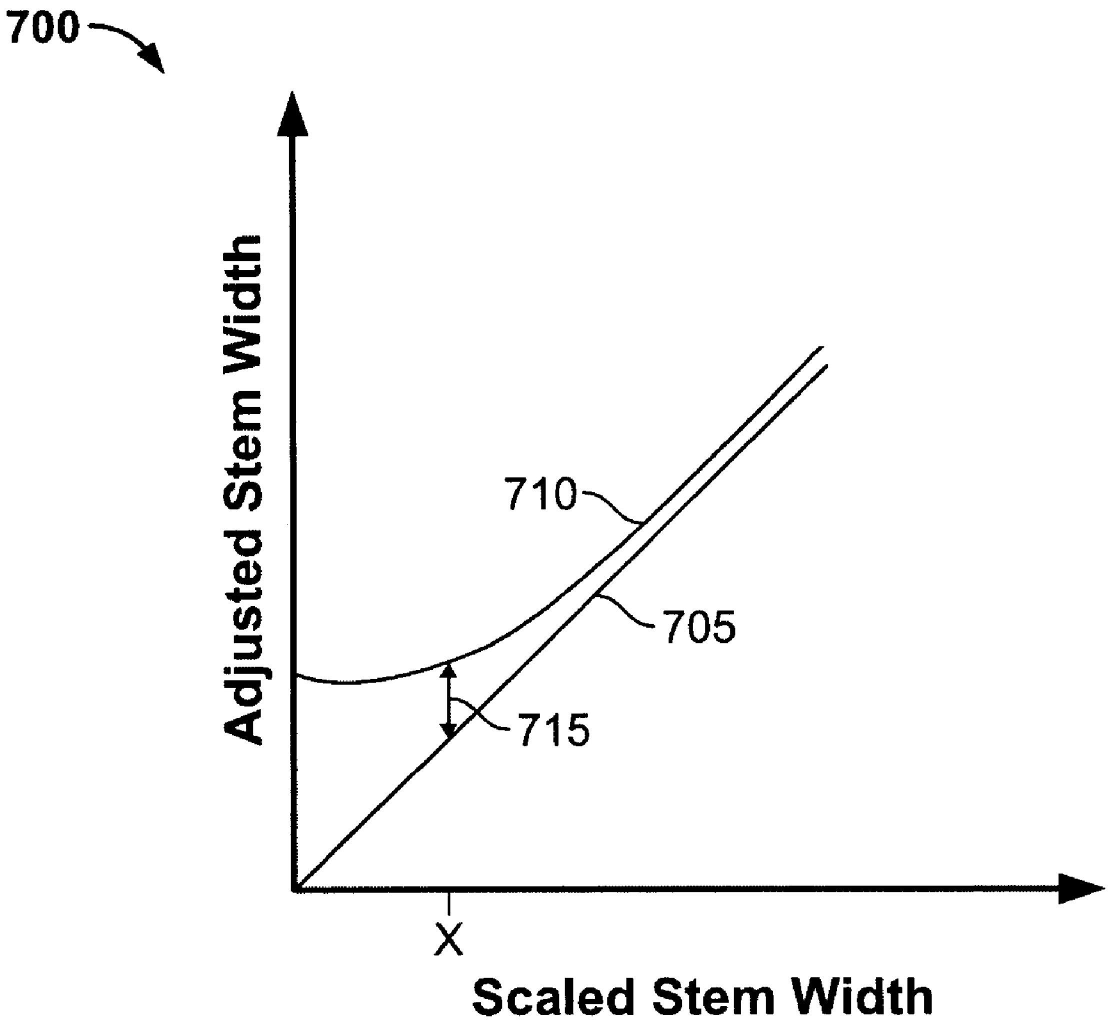
FIGS. 7A–C show graphical representations of initial adjustment values.

Based on the scaled stem width of the glyph, an initial adjustment value for the density values of the device pixels that will represent the glyph can be calculated (step 520). In one implementation, an initial adjustment value can be calculated by reference to a graph representing a function, such as the graph 700 shown in FIG. 7A depicting a relationship between a scaled stem width and an adjusted stem width. The horizontal axis of the graph represents a range of scaled stem widths, and the vertical axis represents a range of adjusted stem widths. A linear relationship depicted by a line 705 is shown between the adjusted stem widths and the scaled stem widths when the density values of pixels making up a stem have not been adjusted (i.e., scaled stem width=adjusted stem width). A non-linear relationship depicted by a curve is shown between the adjusted stem width and the scaled stem width when the density values of pixels making up a stem have been adjusted, for example, to compensate for fading that can occur at smaller sizes. At a given scaled stem width, the difference 715 between the line 705 and the curve 710 represents the initial adjustment value.

Figure 7B:
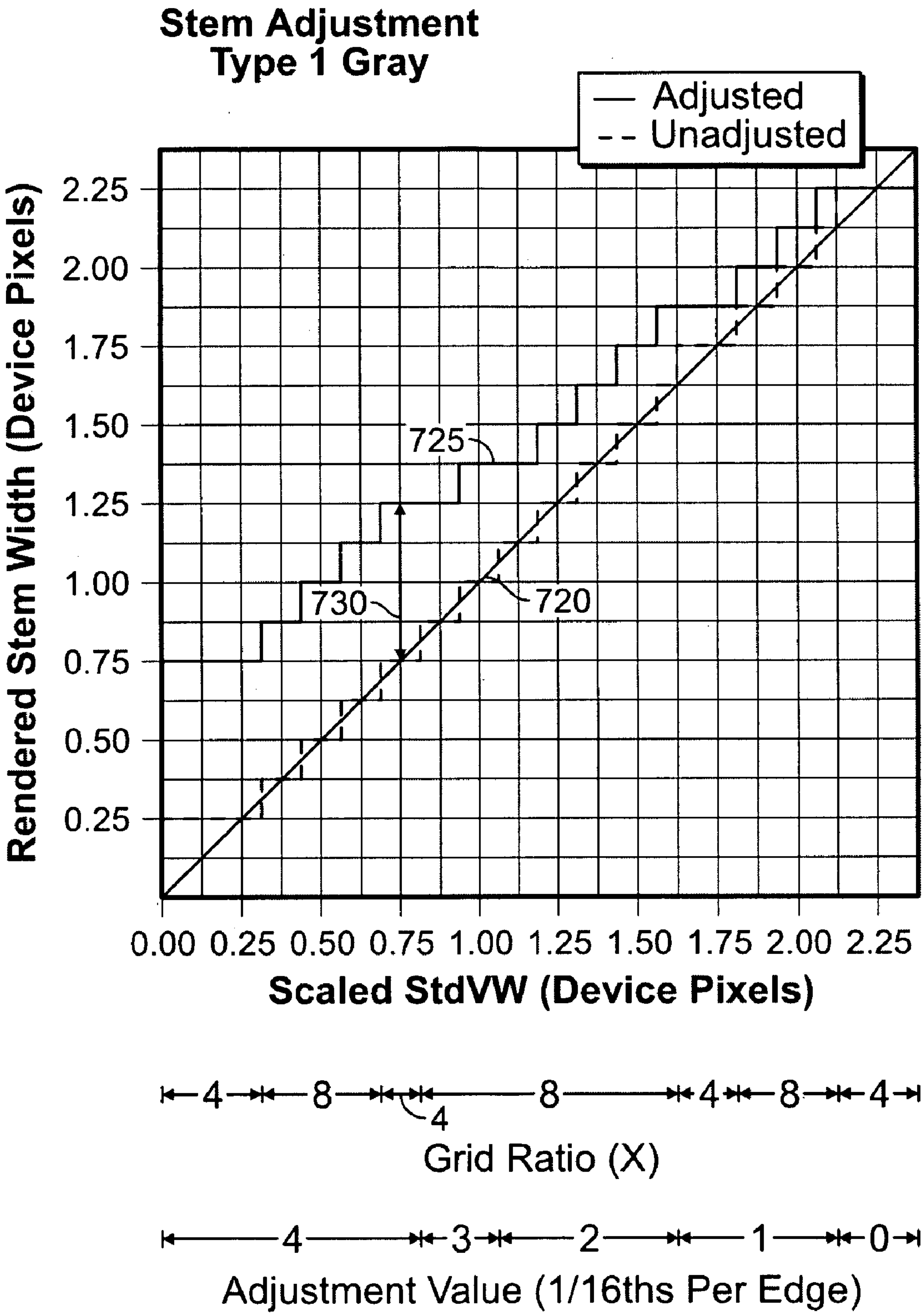
Figure 7C:
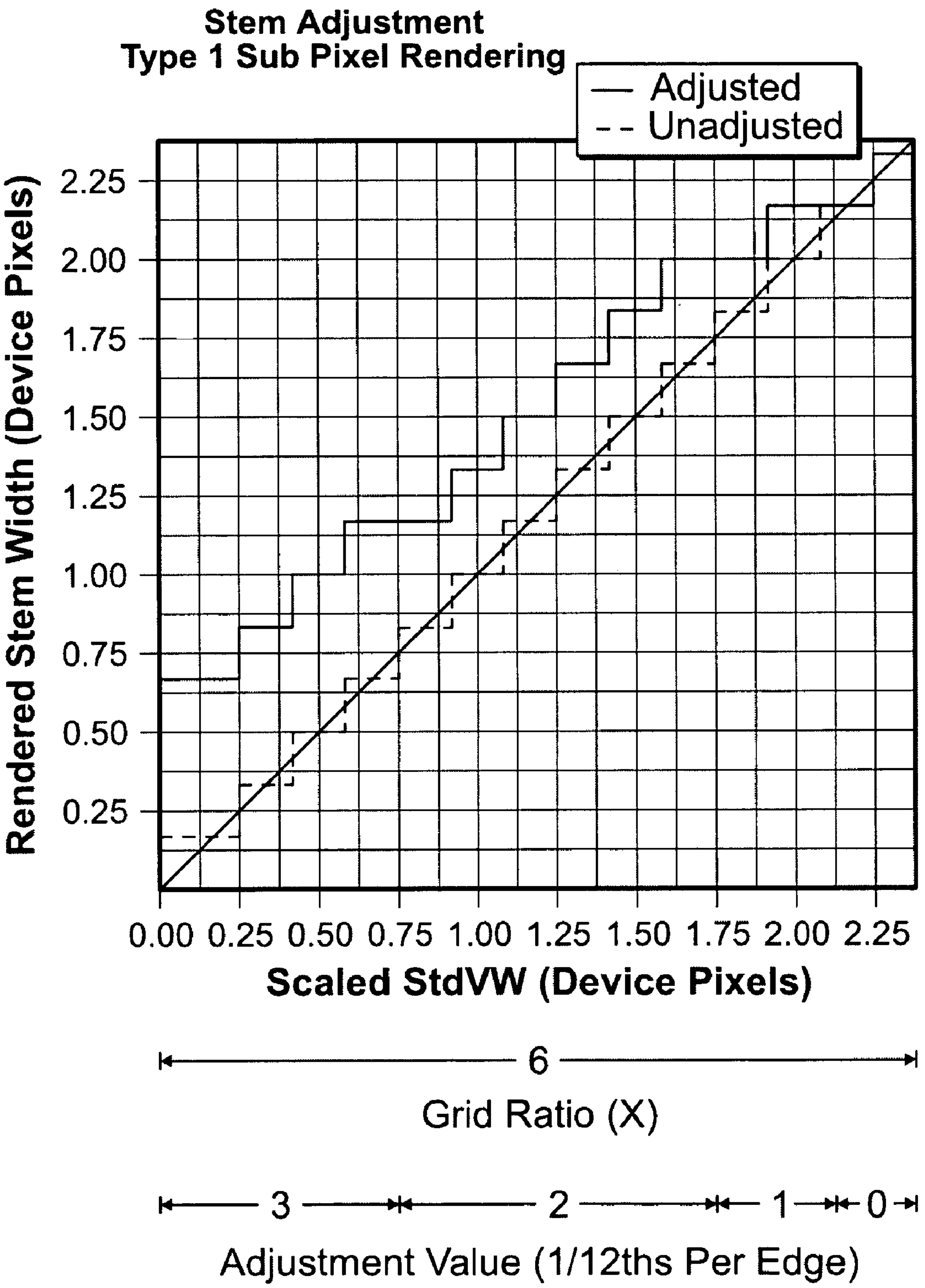

Scaled stem widths and adjusted stem widths are typically calculated in terms of device pixel amounts, for example, using ¼ device pixel increments if rendering a high resolution-bitmap with a 4×4 grid ratio. FIG. 7B shows a graph that can be used to determine an initial adjustment value of a glyph in an Adobe Type 1 font to be displayed in gray scale in an Adobe Acrobat 5.0 application. The adjusted stem width is shown in increments of a ¼ pixel, and the curve 710 of FIG. 7A is therefore replaced by a stepped line 725. The graph shown in FIG. 7C can be used to determine an initial adjustment value of a glyph in an Adobe Type 1 font to be displayed using subpixel rendering. Subpixel rendering refers to a technique wherein the characteristics of a device are taken into consideration in rendering a glyph, for example, taking into consideration the red, green and blue subpixels making up a device pixel in an RGB device. Cleartype rendering available from Microsoft Corporation and Cooltype rendering available from Adobe are examples of fonts that are used for subpixel rendering.

The relationship between a scaled stem width and an adjusted stem width can be implemented as a table, such as the tables illustrated in FIGS. 8A–G. Such tables are useful when implementing the technique in a computer program. FIG. 8A shows a table that can be used to determine an initial adjustment value when a glyph to be rendered is in a Type 1 font to be displayed in gray scale. As an example, consider a glyph having a scaled stem width of $^{12}/_{16}{}^{th}$ of a device pixel. Using the table 800, in particular row 807, an initial adjustment value is $^{4}/_{16}{}^{th}$ or 0.25 of a pixel, per stroke edge. The same value can be found by reference to the graph shown in FIG. 7B; at a scaled stem width of $^{12}/_{16}{}^{th}$ or 0.75. The difference 730 between the line 720 and the stepped line 725 is 0.50 of a pixel, which represents the adjustment per stroke. The adjustment per stroke edge is therefore ½ of this amount, and is 0.25 of a pixel.

In the present example, for illustrative purposes, the scaled stem width and the initial adjustment value have been selected as 1.25 pixels and ¼ pixel per stroke edge respectively. For the purpose of illustrating the techniques for adjusting density values of device pixels described herein, these exemplary values are easy to work with and provide clear illustrations of the benefits of the techniques of the invention. The initial adjustment value has not been selected according to one of the tables shown in FIGS. 8A–G, although in practice the value preferably is chosen according to the relevant table (i.e., based on the font and scaled stem width.

Figure 6A:
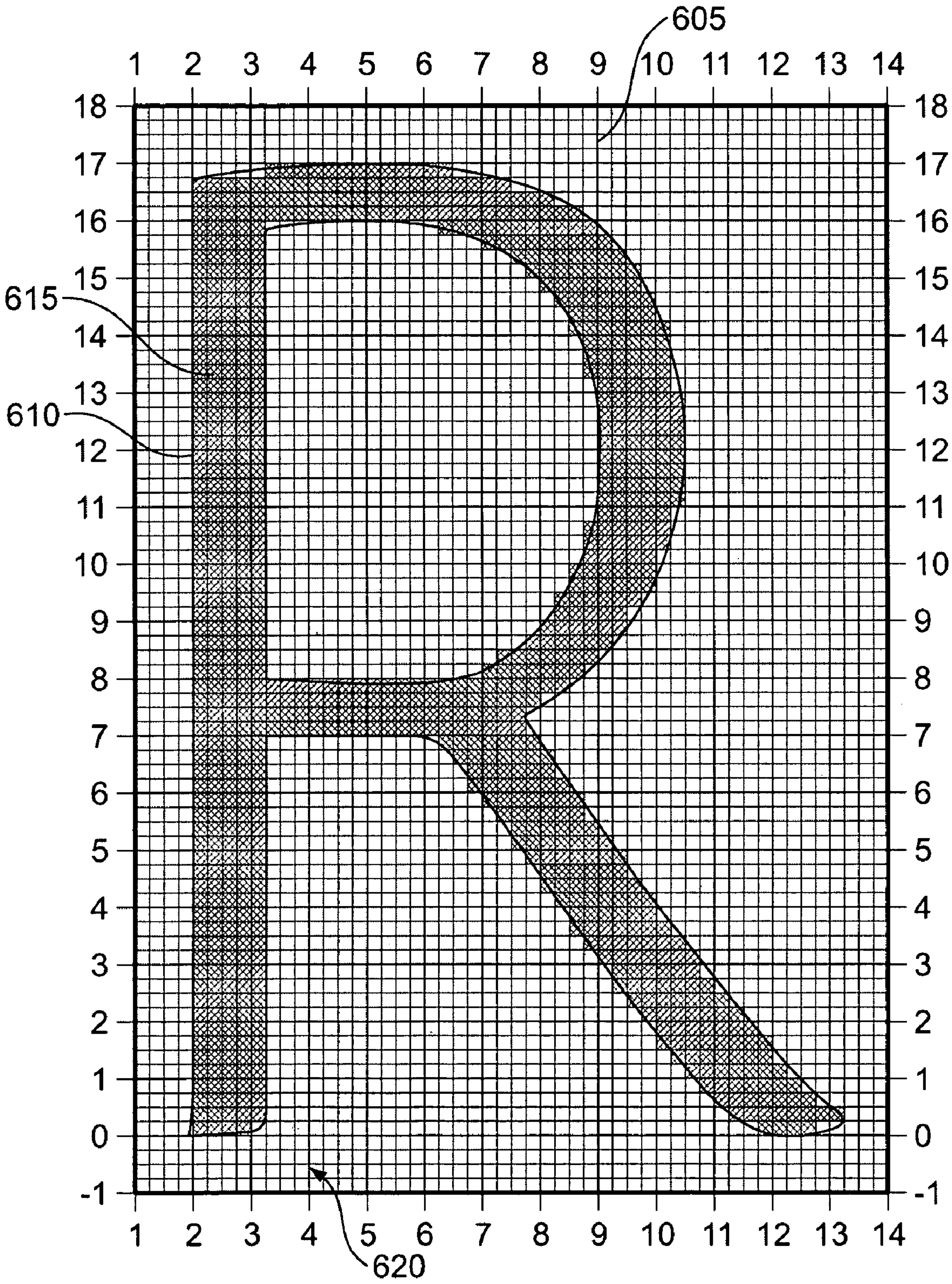
FIG. 6A shows an unadjusted high resolution bitmap representation of a glyph representing the character R.
Figure 6B:
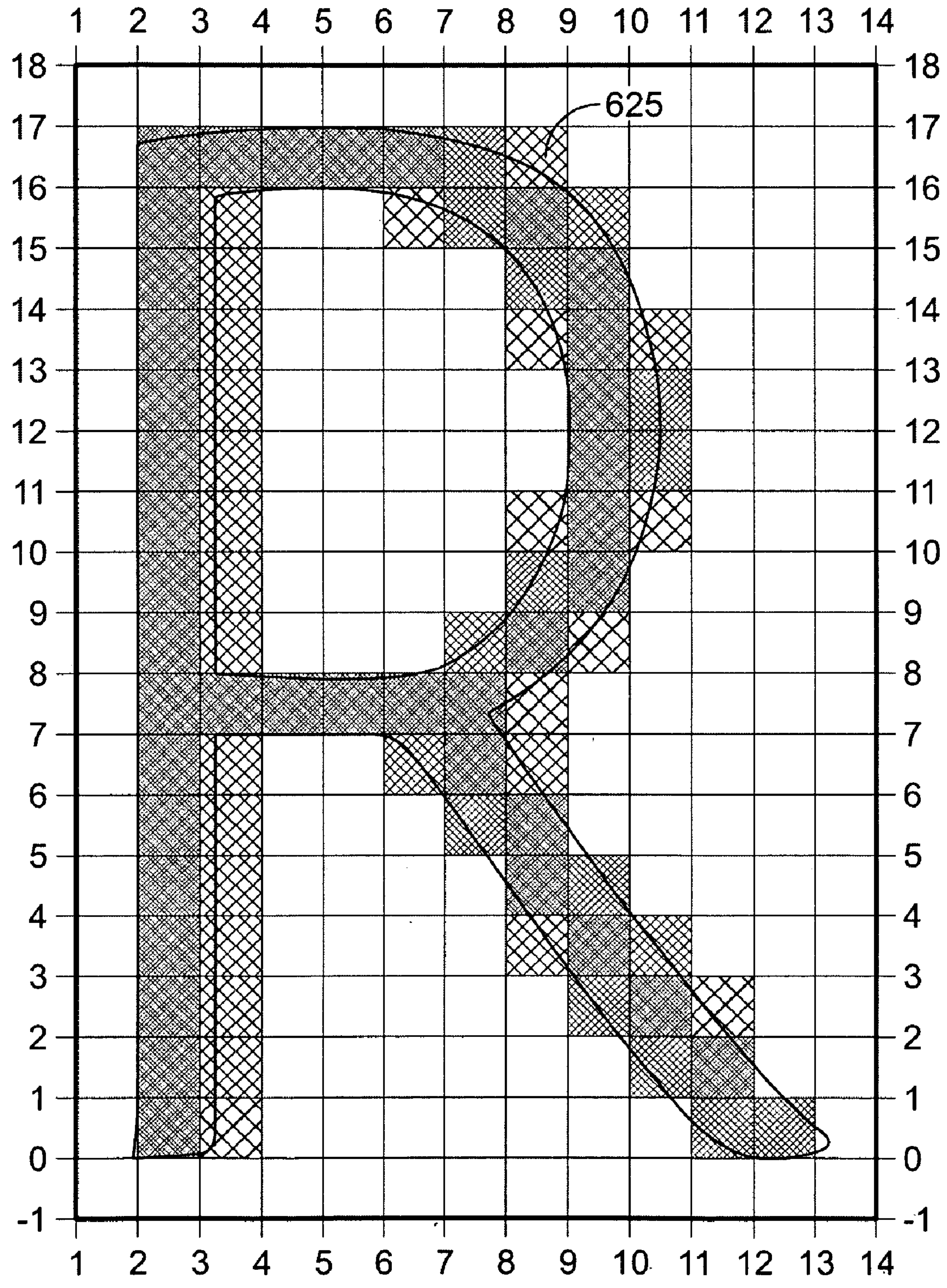
FIG. 6B shows an unadjusted gray scale representation of the bitmap shown in FIG. 6A.

A glyph outline is rasterized to generate a bitmap 605 shown in FIG. 6A (step 522). In a next step, the edges of the strokes forming the glyph are detected (step 525). In one implementation, the formula shown in Table 1 below can be used for edge detection, where the variables "a" through "e"

represent bits in a high resolution rasterizer output having the geometric relationship shown in the first column. The expression is TRUE if the central pixel, "c", represents an edge.

TABLE 1

| | |
|---|---|
| a<br>bcd<br>e | (~c) & (a \| b \| d \| e) |

The calculation can be extended to parallel computation, using the formula shown in Table 2 below. The variables "a" through "e" represent a row of 8 high resolution bits (i.e., a byte), again with the same geometric relationship with the other bytes. The expression is an 8-bit byte where a particular bit in the result is TRUE if and only if the bits corresponding pixel represents an edge. With respect to both Tables 1 and 2, an edge is detected at a bit position if the bit is "off" and one or more of the four neighboring bits is "on". Other techniques for edge detection can be used.

TABLE 2

| | |
|---|---|
| a<br>bcd<br>e | (~c) & (a \| (b<<7) \| (c>>1) \| (c<<1) \| (d>>7) \| e) |

Figure 6C:
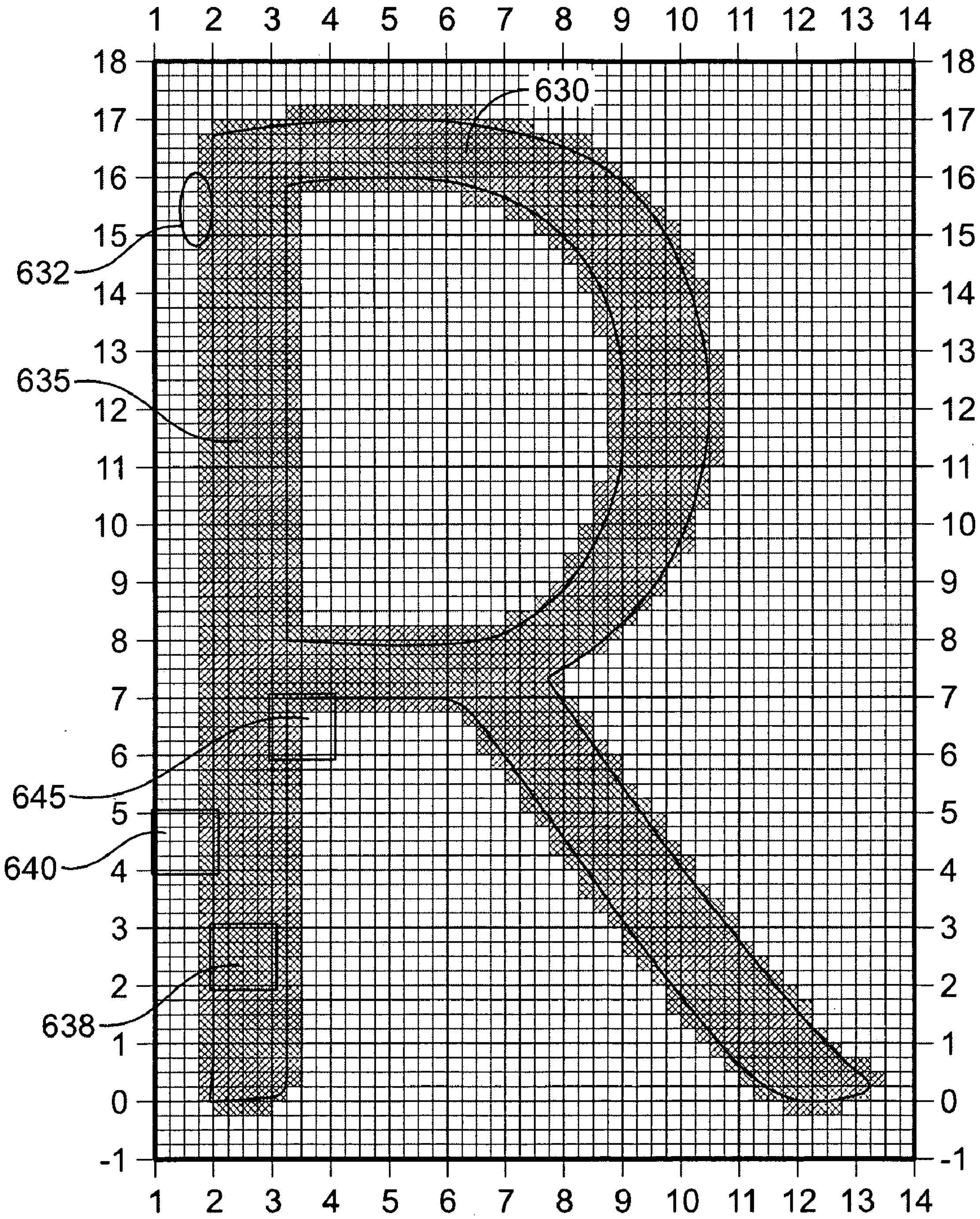
FIG. 6C shows a high resolution bitmap representation of a glyph representing the character R and showing edge detection.

Referring to FIG. 6C, the bitmap 605 of FIG. 6A is shown with the edges detected; the gray fine pixels outlining the original bitmap represent the initial adjustment value, and are referred to herein as the initial adjustment pixels 632. The initial adjustment pixels 632 are shown for illustrative purposes; the bitmap 605 has not actually been altered or re-generated to include the initial adjustment pixels 632. The initial adjustment pixels 632 are shown in FIG. 6C to assist in visualizing the adjustment technique, and are for illustrative purposes.

The density value of the device pixels that are marked by one or more initial adjustment pixels will be adjusted by a final adjustment value; the device pixels that are not marked (i.e., the "interior" or black pixels) will not have their density values adjusted. However, the interior pixels are already at maximum density. Although their density value is not adjusted, the adjustment "carries over" into neighboring pixels. That is, although the density value of an interior pixel cannot be increased, the amount by which an interior pixel would have been increased (if it were not already at maximum density), can be applied to a neighboring pixel, which may have an initial density value of zero.

Conventional darkening would not have darkened pixel 638 nor the other pixels forming the left edge of the vertical stem (because they already have maximum density value). The left edge of the vertical stem would remain unchanged after darkening the glyph. The technique illustrated in FIG. 6C allows the darkening or adjustment of the maximum density pixels forming the vertical stem to carry over into the neighboring pixels, for example pixel 640 which is marked by four initial adjustment pixels 632. Pixel 640 initially was not marked by any fine grid pixels and was not included in the gray scale representation of the glyph (see FIG. 6B). However, pixel 640 will be included in the adjusted gray scale representation downsampled from the bitmap 630.

To determine the final adjustment value for device pixels marked by the initial adjustment pixels 632, the length of the edge of a stroke passing through the device pixels is calculated (step 530). In one implementation, the length is calculated in terms of the number of initial adjustment pixels 632 included in a device pixel divided by the grid ratio. For example, the length of the edge 610 of the vertical stem passing through device pixel 640 is 4 initial adjustment pixels divided by a grid ratio of 4, and is therefore 1. The length of the edge of the vertical and horizontal strokes passing through device pixel 645 is 6 initial adjustment pixels divided by a grid ratio of 4, and is therefore 1.5.

The final adjustment value for a device pixel is calculated from the initial adjustment value and the length of the edge passing through the device pixel as follows (step 535):

$$\text{Final Adjustment Value}=\text{Initial Adjustment Value}\times\text{Length of Edge}$$

The initial adjustment value is expressed in terms of the adjustment of a device pixel per stroke edge. The length of the edge of a stroke passing through a device pixel is represented as the number of initial adjustment pixels divided by the grid ratio. For example, the final adjustment value of device pixel 640 can be calculated as follows. The initial adjustment value was previously determined above for the glyph at a point size of 26 pixels per em to be ¼ of a device pixel per edge. As shown in FIG. 6C, the length of the edge of the glyph passing through device pixel 640 is $4/4=1$. Applying the above formula, the final adjustment value can be calculated as follows:

$$(\text{Final Adjustment Value})_{640}=1/4\times 1=1/4=0.25$$

As a second example, the final adjustment value of device pixel 645 can be calculated as follows:

$$(\text{Final Adjustment Value})_{645}=1/4\times 1.5=3/8=0.375$$

The final adjustment value for device pixel 645 is greater than the final adjustment value for device pixel 640, and accordingly the density value of device pixel 645 will undergo a relatively larger adjustment than the density value of device pixel 640. If the output is a gray scale representation in shades of gray and black against a white background, then device pixel 645 will appear to have been "darkened" more than device pixel 640.

The density value for each device resolution pixel is calculated (step 540), taking into account a final adjustment value for the device pixel if applicable (i.e., if the device pixel includes one or more initial adjustment pixels). Density values can be expressed as a value ranging between 0 and 1. The adjusted density value can be calculated according to the formula below.

$$\text{Adjusted Density Value}=\text{Original Density Value}+\text{Final Adjustment Value}$$

For example, the adjusted density value for device pixel 640 can be calculated as follows:

$$(\text{Adjusted Density Value})_{640}=0+0.25=0.25$$

The level of gray applied to the device pixel 640 when rendering a gray scale representation of the pixel 640 shall correspond to a density of 0.25. The adjusted density value for device pixel 645 can be calculated as follows:

$$(\text{Adjusted Density Value})_{645}=4/16+3/8=0.625$$

Figure 6D:
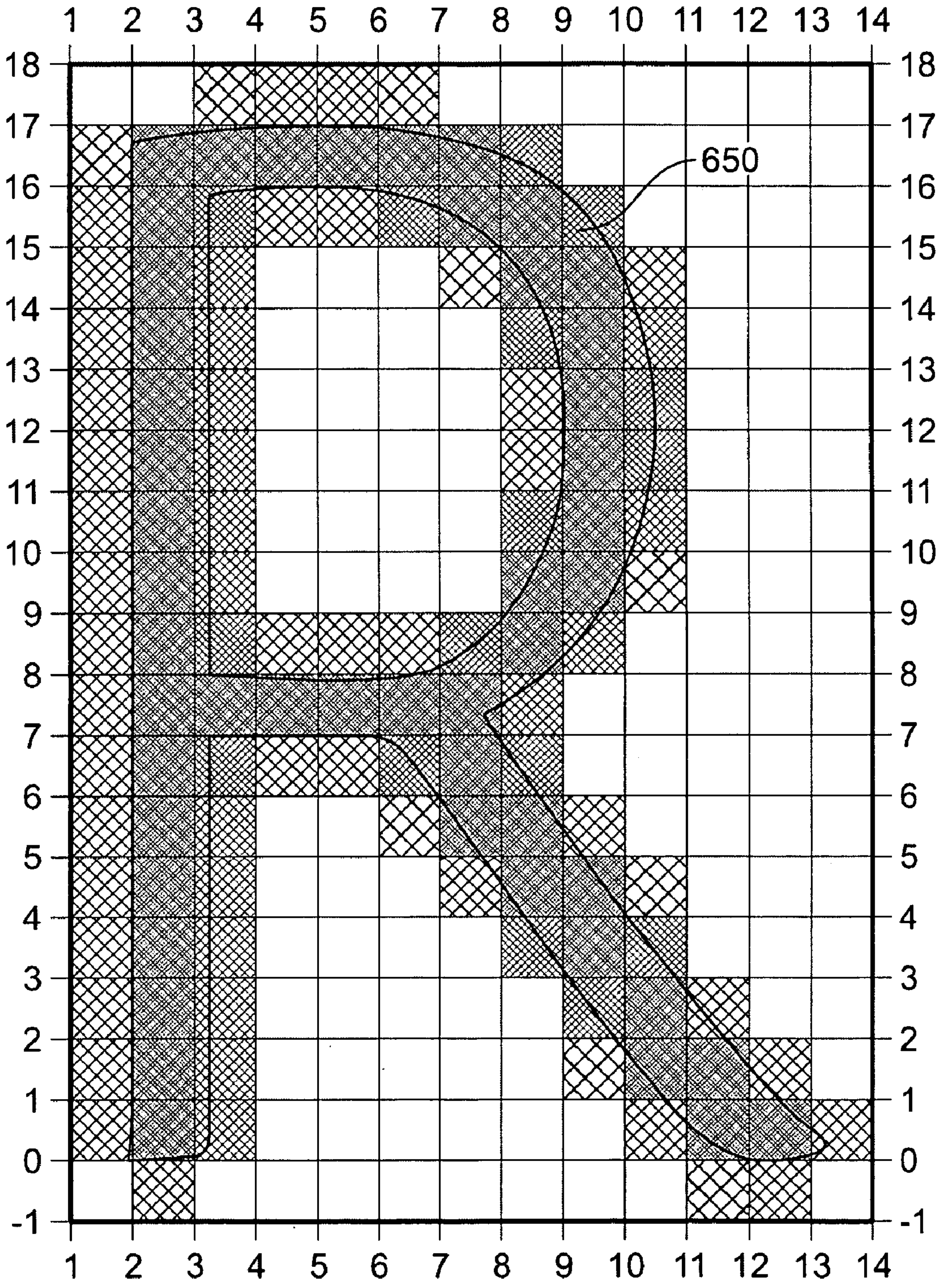
FIG. 6D shows an adjusted gray scale representation of the bitmap shown in FIG. 6C.

Referring to FIG. 6D, an adjusted gray scale representation 650 of the glyph is shown with the final adjustment values applied to adjust the density values of the edge pixels. A comparison of the adjusted gray scale representation 650 to the original gray scale representation 625 shown in FIG. 6B illustrates the effect of adjusting the pixel density values of the edge pixels. This adjustment may include a carry over adjustment into neighboring pixels, such as along the left edge 610 of the vertical stem 615. For example, in the original bitmap 600, device pixel 640 was not marked by any fine grid pixels, and therefore had a density value of 0. This is reflected in the original gray scale representation, i.e., the device pixel 640 is white. By contrast, in the bitmap shown in FIG. 6C, the device pixel 640 is marked with initial adjustment pixels, and the density value is adjusted by the final adjustment value from 0 to 0.25.

Similarly, device pixel 645 had an original density value of 4/16 or 0.25, which is represented by a gray level shown in FIG. 6B. This gray level is lighter (i.e., of a lower density level) than the gray level shown in FIG. 6D, corresponding to the adjusted density value of 0.625. The overall appearance of the adjusted gray scale representation 650 is darker than the overall appearance of the original gray scale representation 625. The number of device pixels marked by the vertical stem increased from 2 pixels to 3 pixels, thereby widening the stem, in terms of marked device pixels.

The technique for calculating final adjustment values and adjusting the density value of device pixels can be implemented in fonts such as Adobe's Type 1 font, Type 2 font, as well as TrueType fonts, and other fonts. Implementations of the technique are not limited to rendering text, i.e., glyphs, but can be implemented in any thin, filled shape. For example, in a graphics application drawing lines, such as a grid in a spreadsheet, the above technique can be implemented to adjust the density values of device pixels representing the lines forming the grid.

Minimizing the number of device pixels marked by a glyph's stroke represented by adjusted density values may be desirable in some implementations. For example, the adjusted gray scale representation of the glyph in FIG. 6D has a vertical stem that is marked by 3 device pixels. This is one pixel wider than the original, unadjusted gray scale representation 605 of the glyph in FIG. 6B, which has a vertical stem width of 2 pixels. The left edge 610 of the original gray scale representation 625 is represented by a column of maximum density (i.e., black) pixels, whereas the left edge of the adjusted gray scale representation 650 is represented by a column of low density pixels. Such a column of low density pixels may give a blurred appearance to a reader.

The blurring effect can occur when, pre-adjustment, the outline of the glyph is hinted to align one or more edges of the outline to the device resolution grid. For example, referring to FIG. 9A, a high resolution bitmap representation 900 of a glyph corresponding to the character "R" is shown. The glyph is associated with the Adobe Type 1 CronosMM font and is to be rendered at a 26 pixels per em size. The glyph outline 902 that was rendered as the bitmap representation 900 is also depicted for illustrative purposes. The glyph outline 902 was hinted such that the left edge 904 of the glyph outline 902 aligns to the device resolution grid 906. The glyph outline 902 is hinted according to, for example, the black edge hinting policy described in pending U.S. patent application Ser. No. 09/739,587 filed Dec. 15, 2000, by T. Dowling and R. D. Arnold, entitled "Hinted Stem Placement on High Resolution Pixel Grid", the entire contents of which are hereby incorporated by reference. Referring to FIG. 9B, the original (i.e., unadjusted) gray scale representation 908 of the glyph downsampled from the bitmap 900 is shown. The left edge of the vertical stem 910 is represented by maximum density (i.e., black) pixels.

Figure 9A:
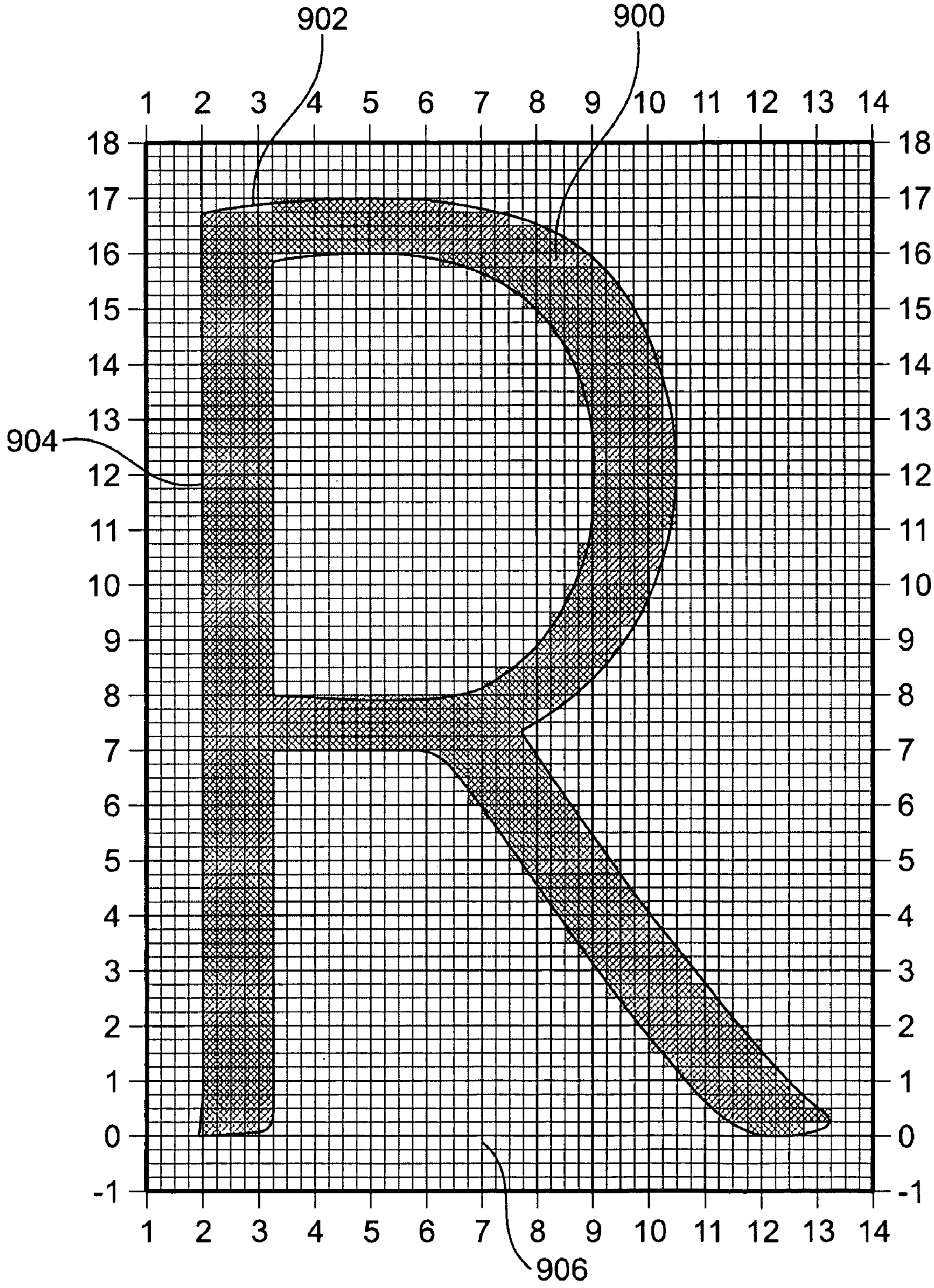
FIGS. 9A–G show high resolution bitmap and gray scale representations of a glyph representing the character R.
Figure 9B:
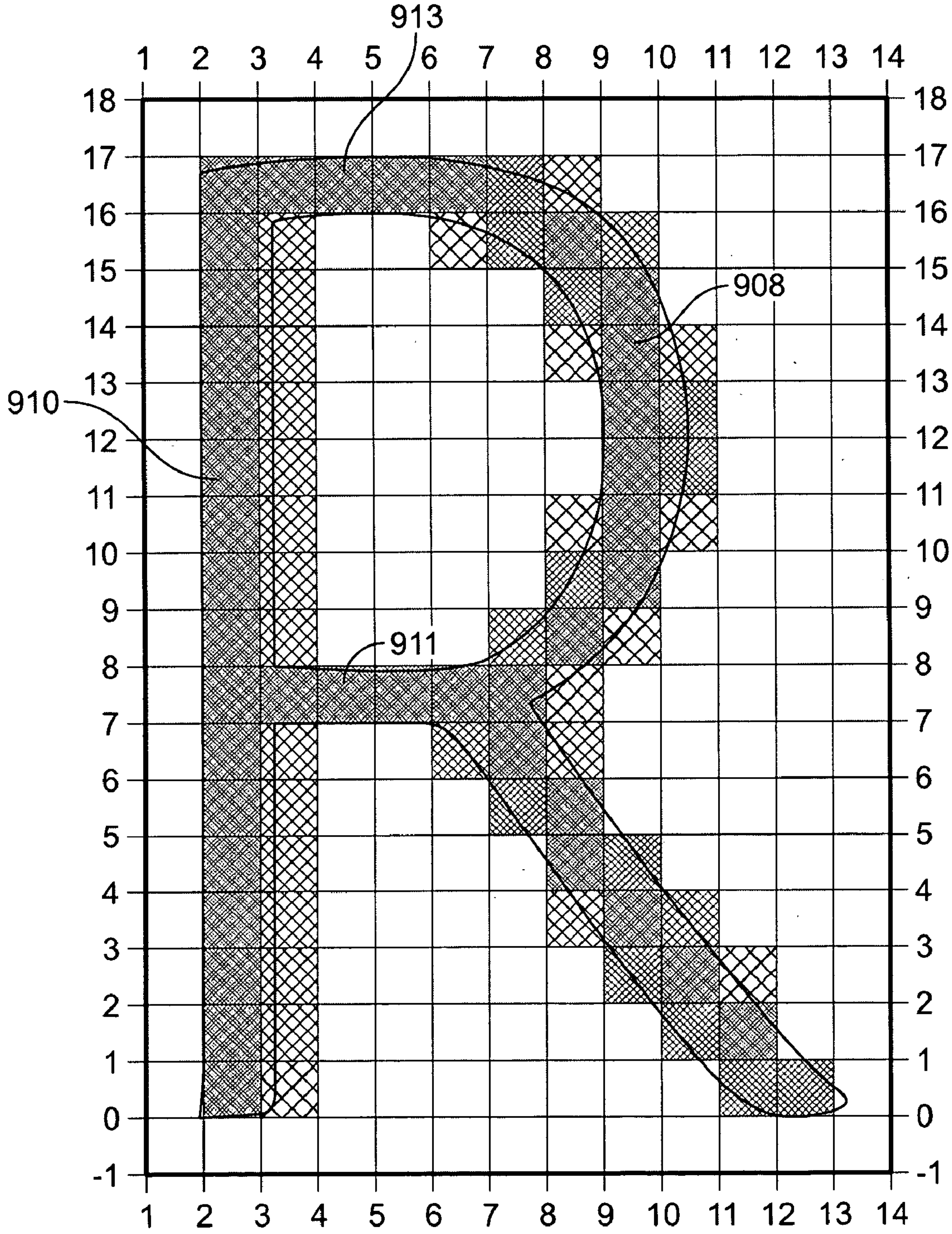
Figure 9C:
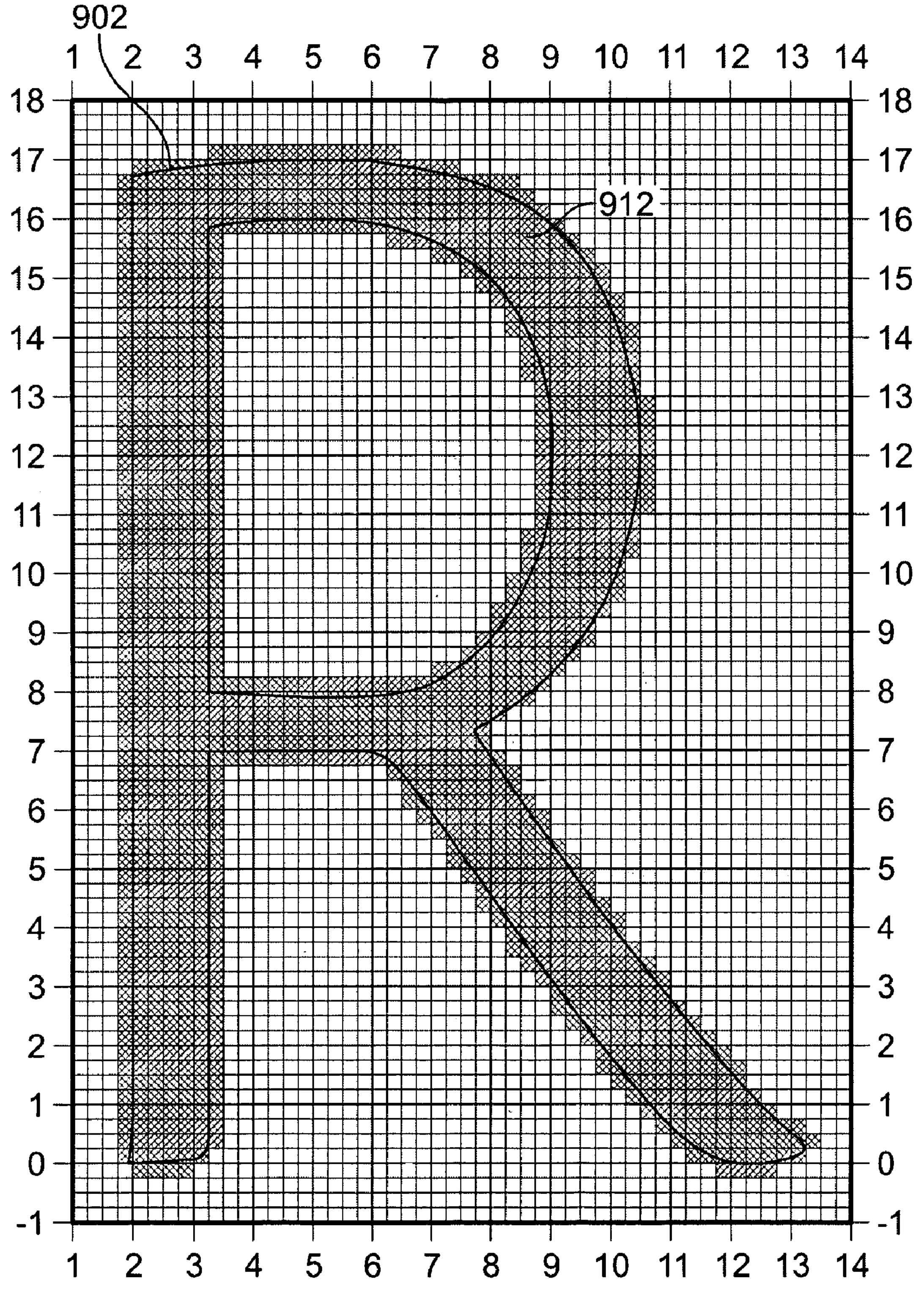
Figure 9D:
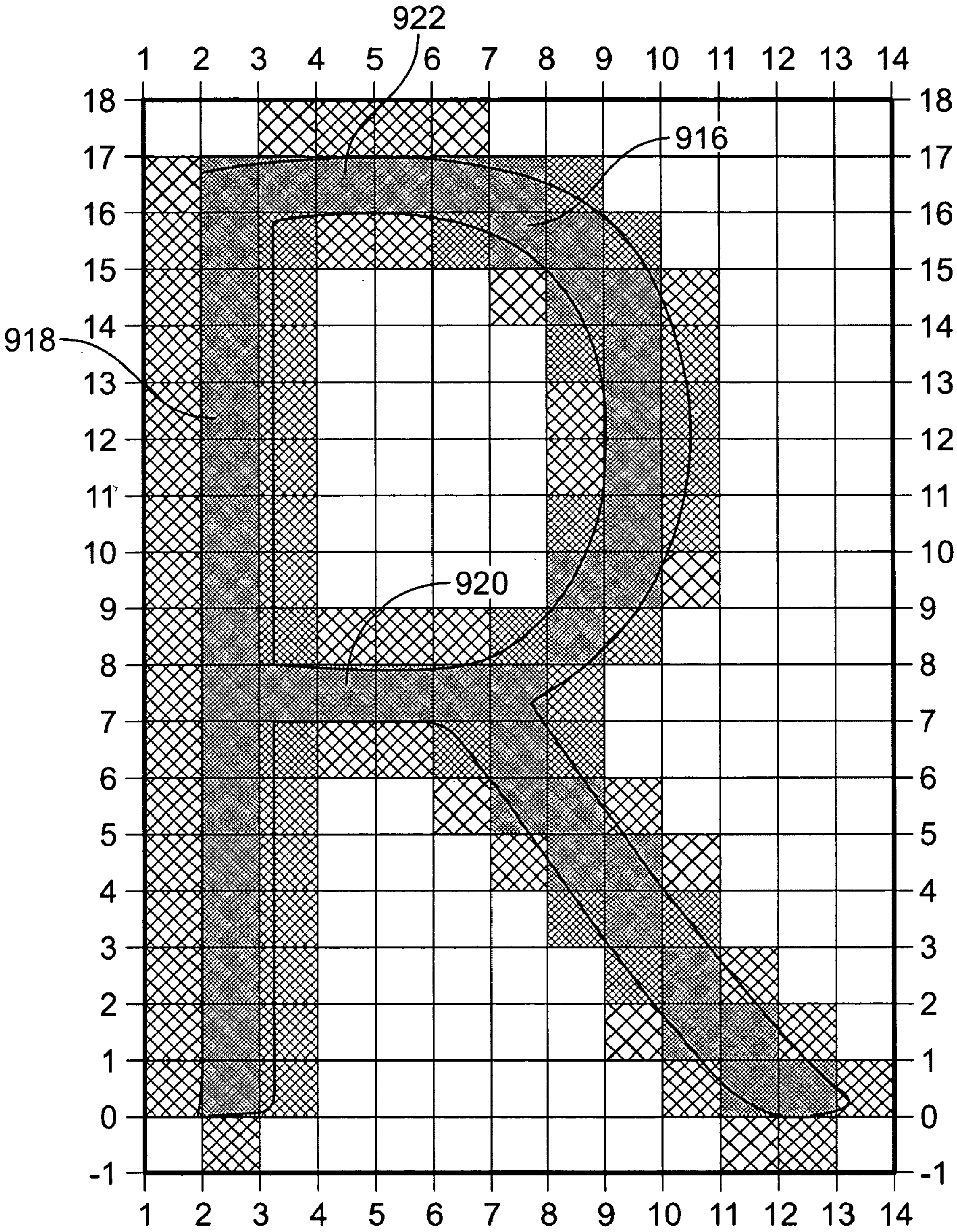

FIG. 9C shows a high resolution bitmap 912 representation of the glyph, which for illustrative purposes includes edges that have been adjusted by an initial adjustment value of ¼ of a device pixel. The outline 902 is shown overlying the bitmap 912 for illustrative purposes and corresponds to the original hinted outline shown in FIG. 9A. FIG. 9D shows an adjusted gray scale representation 916 downsampled from the bitmap 912. The vertical stem 918 in the adjusted gray scale representation 916 is 3 device pixels wide, as compared to the vertical stem 910 in the original gray scale representation, which is 2 device pixels wide. The horizontal stems 920 and 922 of the adjusted gray scale representation 916 are also 3 device pixels wide, as compared to the 1 pixel width of the corresponding horizontal stems 911 and 913 in the original gray scale representation 908. The wider vertical and horizontal stems in the adjusted gray scale representation 916 can have a blurring effect.

Figure 10:
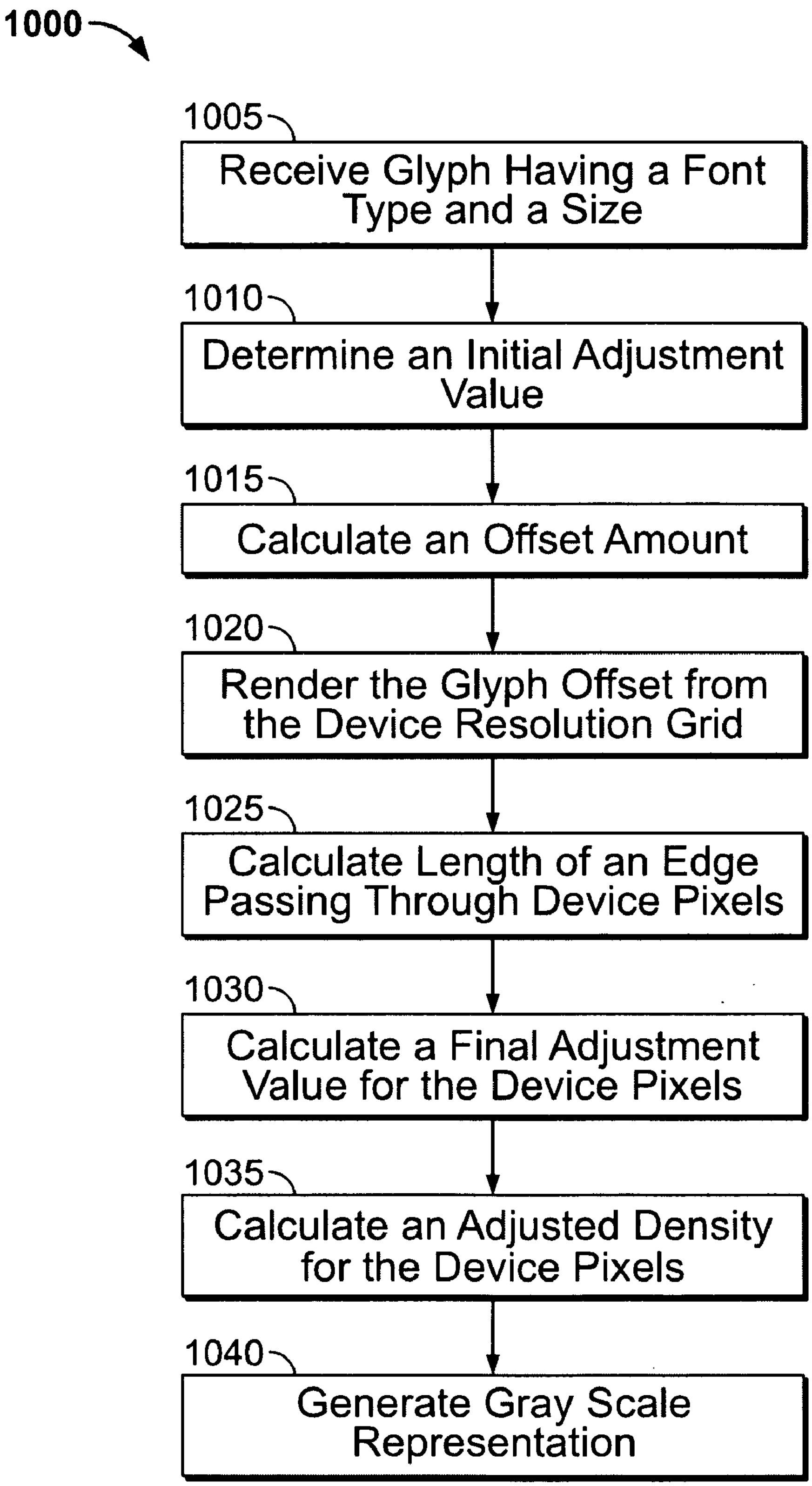
FIG. 10 shows a process for adjusting the density values of device pixels representing a glyph, while minimizing the stroke width in terms of device pixels.

Referring to FIG. 10, a process 1000 is shown to adjust the density values of device pixels representing a glyph, while minimizing the stroke width in terms of device pixels to provide sharp edges for readability and maintaining contrast. For illustrative purposes, the glyph represented in FIGS. 9A and 9B will be adjusted according to the process 1000. In a first step, a glyph to be rendered at a certain size and belonging to a font is received (step 1005). In this example, the size is 26 pixels per em and the font is Adobe Type 1 CronosMM. An initial adjustment value for the glyph is determined (step 1010) based on a scaled stem width of the glyph, using the techniques described above. In the present example, the initial adjustment value is ¼ of a device pixel per glyph edge.

An offset amount is calculated, which will be an amount by which the glyph will be offset from the device resolution grid 906 when a bitmap is rasterized (step 1015), as compared to the position of the original grid outline 906. The bitmap representation of the glyph is rasterized offset from the device resolution grid 906 by the offset amount (step 1020).

In one implementation, the offset amount is calculated as 1/n, where n is the grid ratio. That is, if the ratio of the high resolution grid to the device resolution grid is 8×8, then an offset amount of ⅛ is calculated. Preferably, the offset amount is greater than or equal to the initial adjustment value. If a grid ratio of 8 gives an offset amount that is less than an initial adjustment value, then the grid ratio is adjusted, for example, to 4, thus giving a greater offset value of ¼.

Figure 9E:
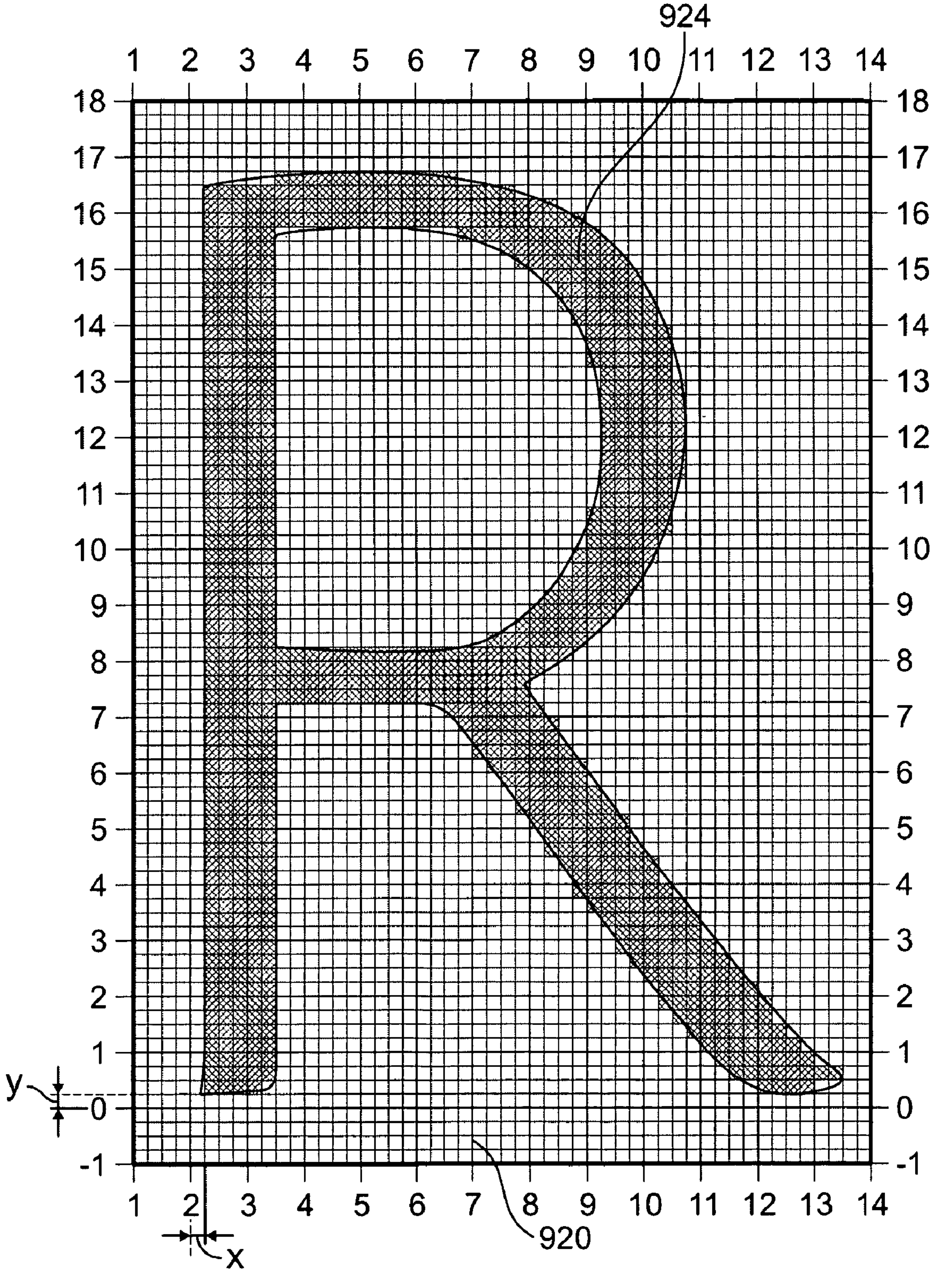

Referring to FIG. 9E, a high resolution bitmap representation 924 of the glyph is shown, offset from the device resolution grid 906 by ¼ device pixel in the x and the y directions relative to the original position of the glyph outline 902 shown in FIG. 9A. By rendering the glyph offset from the device resolution grid 906 by the offset amount, the density values of the device pixels can be adjusted (i.e., the strokes "darkened"), while maintaining alignment of one or more of the glyph's edges to the device resolution grid 906. In the present example, the initial adjustment value is ¼ pixel. Therefore a device pixel can be adjusted by a density value of up to ¼ pixel, i.e., the final adjustment value of a device pixel's density value can be ¼ pixel or less. The offset amount selected in the present example is ¼ of a device pixel, which is equal to the initial adjustment value.

Figure 9F:
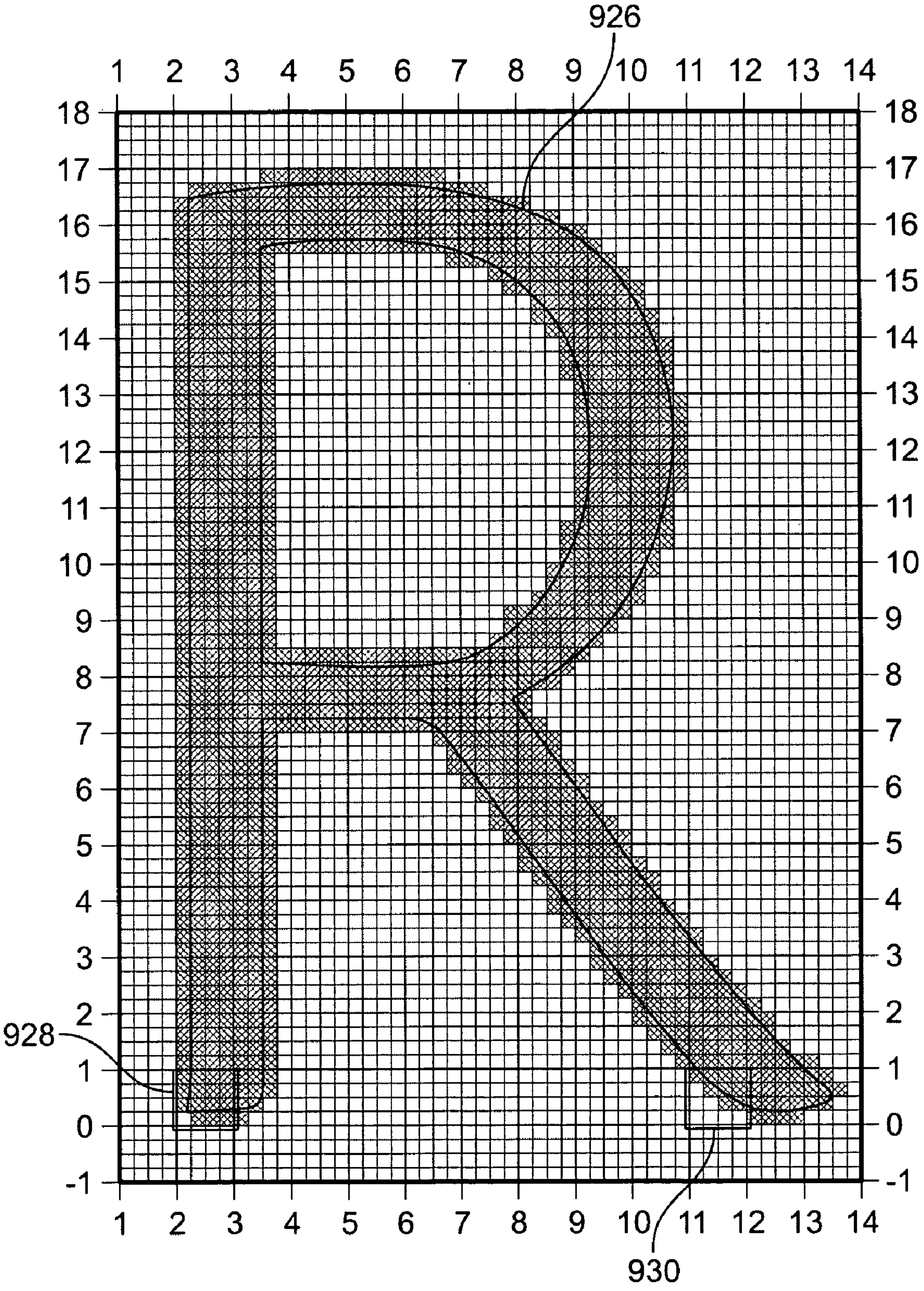

Using techniques described above in reference to FIGS. 5 and 6A-D, the length of an edge of the glyph passing through a device pixel representing the glyph offset from the device resolution grid 906 by the offset amount is calculated (step 1025). FIG. 9F shows a high resolution bitmap representation 926 of the glyph that is offset from the device resolution grid 906 by the offset amount. For illustrative purposes, the bitmap representation of the glyph is shown adjusted along the edges of the glyph by the initial adjustment value (i.e., ¼ pixel). The fine resolution pixels shown in gray on the outside of the glyph outline 902 are the initial adjustment pixels and represent the initial adjustment value. As described above, the length of an edge of the glyph passing through a device pixel can be calculated by counting the number of initial adjustment pixels marking the device pixel and dividing by the grid ratio. For example, device pixel 928 is marked by 6 initial adjustment pixels, and device pixel 930 is marked by 4 initial adjustment pixels.

A final adjustment value for the device pixels is calculated based on the initial adjustment value and the lengths of the edge passing through the device pixels (step 1030). For example, the final adjustment values for device pixels 928 and 930 can be calculated as follows:

$$(\text{Final Adjustment Value})_{928}=\tfrac{1}{4}\times\tfrac{6}{4}=\tfrac{6}{16}=0.375$$

$$(\text{Final Adjustment Value})_{930}=\tfrac{1}{4}\times\tfrac{4}{4}=\tfrac{1}{4}=0.25$$

The adjusted density values of the device pixels representing the glyph are calculated based on the original density values and the final adjustment values (step 1035). For example, the adjusted density values for the device pixels 928 and 930 can be calculated as follows:

$$(\text{Adjusted Density Value})_{928}=\tfrac{9}{16}+0.375=0.9375$$

$$(\text{Adjusted Density Value})_{930}=\tfrac{5}{16}+0.25=0.5625$$

Figure 9G:
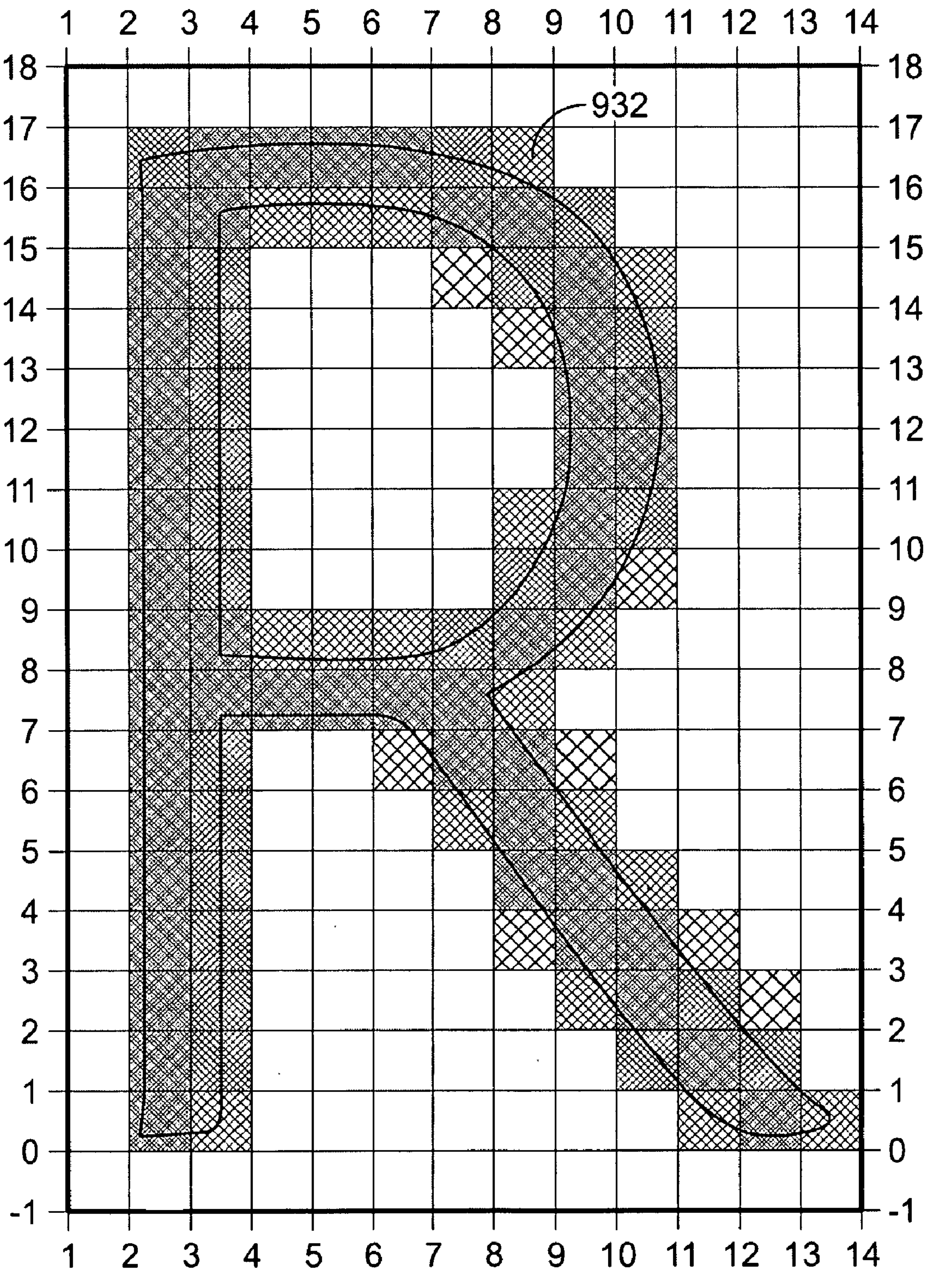

The density values of the rendered glyph 926 are adjusted (step 1040). An adjusted gray scale representation 932 of the glyph shown in FIG. 9G is generated from the adjusted density values and the bitmap 924 (FIG. 9E). A comparison of the adjusted gray scale representation 932 to the original gray scale representation 908 of FIG. 9B illustrates how adjusting the density values of the device pixels darkens the overall appearance of the glyph. The vertical stem width in both the adjusted gray scale representation 932 and the original gray scale representation 908 is 2 device pixels wide. By comparison, the adjusted (but not offset) gray scale representation 916 shown in FIG. 9D, which was not offset from the device resolution grid 906 before rendering and adjusting, has a vertical stem width of 3 device pixels. The horizontal stems 911, 913 of the original gray scale representation 908, which were one maximum density value pixel wide, are darkened in the adjusted gray scale representation 932 and are 2 pixels wide. This occurs without the blurred effect illustrated by the adjusted (but not offset) gray scale representation 916 in FIG. 9D, i.e., contrast with the background is maintained.

In the example shown in FIGS. 9E–G, the glyph was rendered offset by equal offset amounts in both the x and y directions. In another implementation, the glyph can be rendered offset by an offset amount in only one of the x and y directions, or offset by different offset amounts in the x and y directions.

The technique for calculating an offset amount based on an initial adjustment value and rendering the glyph offset from the device resolution grid by the offset amount can be implemented in fonts such as TrueType, Adobe's Type 1 font, Type 2 font, and other fonts that allow similar types of hinting as the Type 1 font. Implementations of the technique are not limited to rendering text, i.e., glyphs, but can be implemented in any thin, filled shape. For example, in a graphics application drawing lines, such as a grid in a spreadsheet, the above technique can be implemented to adjust the density values of device pixels representing the lines forming the grid.

Referring again to the tables shown in FIGS. 8A–G, an implementation of the above described density value adjustment and glyph offsetting techniques is described in further detail. FIG. 8A is an example of a table 800 that can be used to determine an initial adjustment value when a glyph to be rendered is an Adobe Type 1 font to be displayed in gray scale. The first column 802 includes a set of scaled stem width values expressed in terms of $\tfrac{1}{16}^{th}$ of a device pixel. Referring to the sixth row 803, the scaled stem width is 5 or $\tfrac{5}{16}^{th}$ of a device pixel. The table includes scaled stem widths up to a maximum value of 37, or 2 and $\tfrac{5}{16}^{th}$ of a device pixel. Typically, a table such as this includes scaled stem width values up to a maximum of just over 2 device pixels in width.

The second and third columns 804 and 806 are the X and Y grid ratios respectively. The values in these columns indicate, at a given scaled stem width, the grid ratio for a high resolution bitmap that will be rendered to represent the glyph. In this particular table, at certain scaled stem widths the grid ratio is 4×4(i.e., 4 fine grid pixels in the x and y directions for each device pixel), whereas at other scaled stem widths the grid ratio is 8×8. The fourth column 808 indicates the hint grid ratio that is the ratio of the grid to which the glyph outline is hinted to, relative to the device resolution grid. The sixth column 809 indicates the hinting policy. The sixth and seventh columns 810 and 812 indicate the alignment in the x and y directions. For example, referring to row 803, the x alignment value is 8 and the hint grid ratio is 8. That is, the glyph outline was hinted to a fine grid having a grid ratio of 8×8 as compared to the device resolution grid. The position of the glyph outline was aligned to $\tfrac{1}{8}^{th}$ of a device pixel (i.e., aligned to the fine grid). If, for example, the x alignment value is 1, that indicates the position of the glyph outline was aligned to the device resolution grid.

The next two columns 814 and 816 indicate the x and y offset amounts respectively. For example, referring to row 803, at a scaled stem width of $\tfrac{5}{16}^{th}$, the glyph is rendered offset from the hinted glyph outline position by 0 in the x direction and by 1 in the y direction. A high resolution bitmap representation of the glyph will not be offset in the x direction, but will be offset by an amount of $\tfrac{1}{8}^{th}$ of a device pixel (i.e., 1 fine grid pixel) in the y direction. At other scaled stem widths, such as 11 through 25 sixteenths of a device pixel, the glyph is rendered offset by $\tfrac{1}{8}^{th}$ of a device pixel in both the x and the y directions.

The next two columns 818 and 820 indicate whether the adjustment to pixel density values will "carry" over to a neighboring pixel in the x and y directions respectively. A value of 0 indicates that there will be no carrying (i.e., 0=no), and a value of 1 indicates that there will be carrying (i.e., 1=yes). For example, referring to row 803, the x and y adjustment can carry in both the x and y directions, since the values in columns 818 and 820 are both 1 (i.e., "yes"). If the value in either column is 0, meaning the adjustment value cannot carry into a neighboring pixel in the corresponding direction, then the edge detector will not identify such a neighboring pixel when detecting the edge.

The final column on the right, column 822, indicates the initial adjustment value corresponding to the scaled stem width indicated in the first column 802. For example, referring to row 803, at a scaled stem width of $\tfrac{5}{16}^{th}$, the initial adjustment value is $\tfrac{4}{16}$.

Tables similar to FIG. 8A are shown in FIGS. 8C–G. FIG. 8C shows a table for determining initial adjustment values when using a Type 1 font that is to be displayed using subpixel rendering. The grid ratio in this instance is 6×6, which is typical when using subpixel rendering on a RGB output device, as the fine grid resolution can be expressed as a multiple of 3.

FIGS. 8D and 8E show tables that can be used to determine initial adjustment values when using a TrueType font with isotropic anti-aliasing to be displayed in gray scale and subpixel rendering respectively.

FIGS. 8F and 8G show tables for determining initial adjustment values for TrueType fonts to be displayed in gray scale when hinting using an anisotropic anti-aliasing policy. Anisotropic anti-aliasing refers a technique in which a bitmap representation of a glyph is generated by anti-aliasing to some degree in the x direction and to a different degree in the y direction. Anti-aliasing occurs in both directions, but not to the same degree. Thus, an anti-aliasing process is used in the x direction, and a different anti-aliasing process is used in the y direction to generate a high resolution bitmap representation of the glyph. Anisotropic anti-aliasing is described further in U.S. patent application Ser. No. 10/440,013, filed May 16, 2003, by T. Dowling and R. D. Arnold, entitled “Anisotropic Anti-Aliasing”, the entire contents of which are hereby incorporated by reference.

Figure 11A:
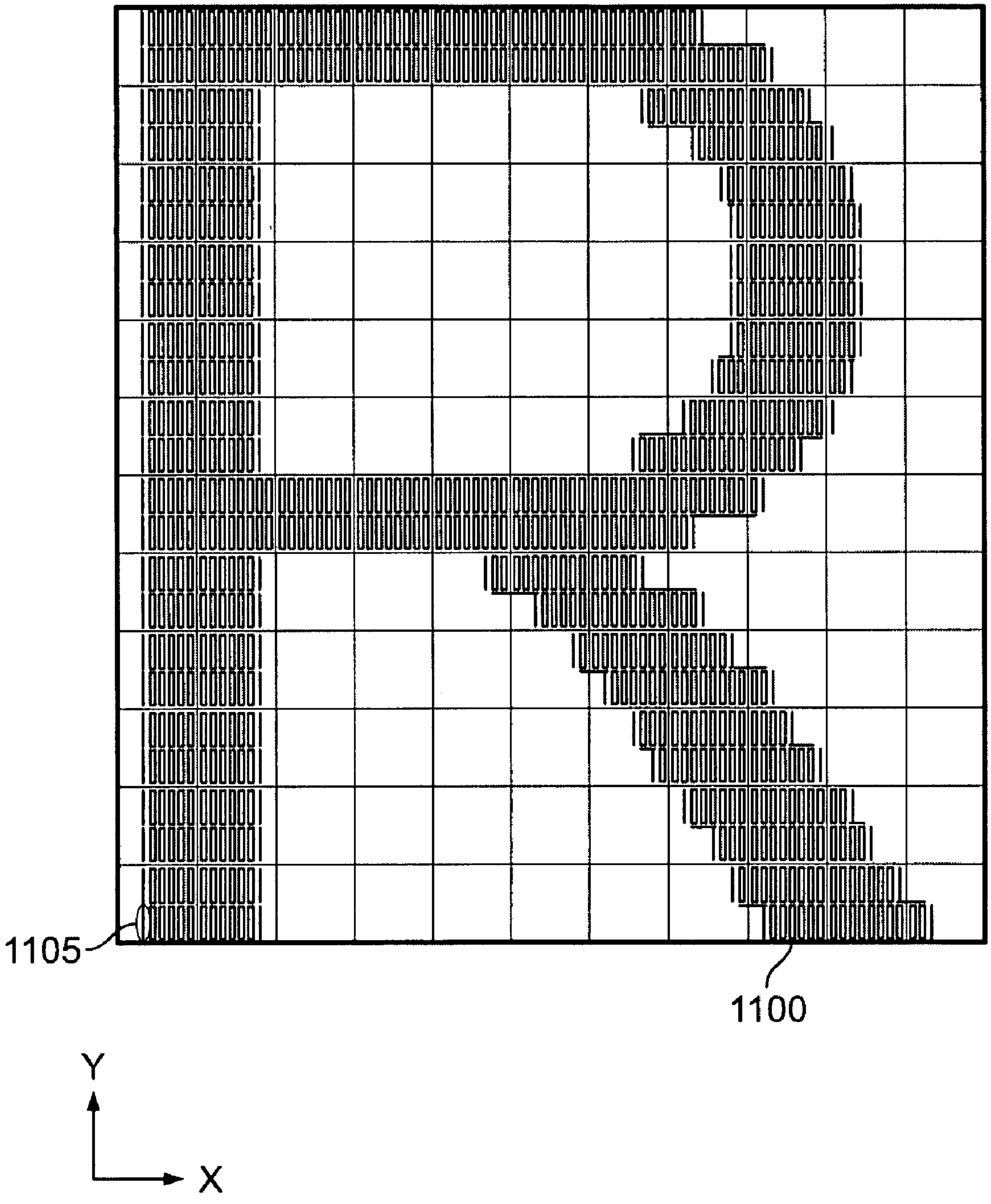
FIGS. 11A–G show density maps and gray scale representations of a glyph representing the character R.

Referring to FIGS. 11A–G, an example of adjusting the density values of a glyph that is generating by anisotropic anti-aliasing is shown. FIG. 11A shows a high resolution bitmap representation 1100 of a glyph representing the character “R”, in a TrueType ArialMT font at a size of 16 ppem. For illustrative purposes, the high resolution pixels in the y direction are stretched vertically to fit the coarse grid corresponding to the device resolution. The grid ratio is 8×2, i.e., 8 fine grid pixels per device pixel in the x direction and 2 fine grid pixels per device pixel in the y direction. The scaled stem width is 1.4 pixels. Referring to FIG. 8C, an initial adjustment value can be determined for the scaled stem width by rounding to $11/8^{ths}$ (i.e., 1.375). Per row 840 (i.e., the row corresponding to a scaled stem width of $11/8^{th}$), the initial adjustment value is 1/16 of a device pixel. There is no “carry” in the y direction, per the Y Carry column 842, and accordingly the edge detector does not detect horizontal edges aligned with device pixel boundaries, however, horizontal edges that are not aligned with device pixel boundaries are detected. In some implementations, not having carry in the y direction can keep horizontal stems sharp, although at the expense of the stem not being darkened in the y direction.

In one implementation, the edges can be detected using the formula shown in Table 3 below, where the edge detector can distinguish between horizontal and vertical edges. The variables “a” through “e” represent bits in a high resolution rasterizer output having the geometric relationship shown in the first column. The expression is TRUE if the central pixel, “c”, represents a vertical and/or horizontal edge.

TABLE 3

| bits | vertical edges | horizontal edges |
|---|---|---|
| a<br>bcd<br>e | (~c) & (b \| d) | (~c) & (a \| e) |

The thin gray line along the perimeter of the bitmap's 1100 edges in FIG. 11A represents the initial adjustment pixels 1105 in the x direction. The horizontal edges that are across device pixel boundaries are not detected and marked by the thin gray line.

Figure 11B:
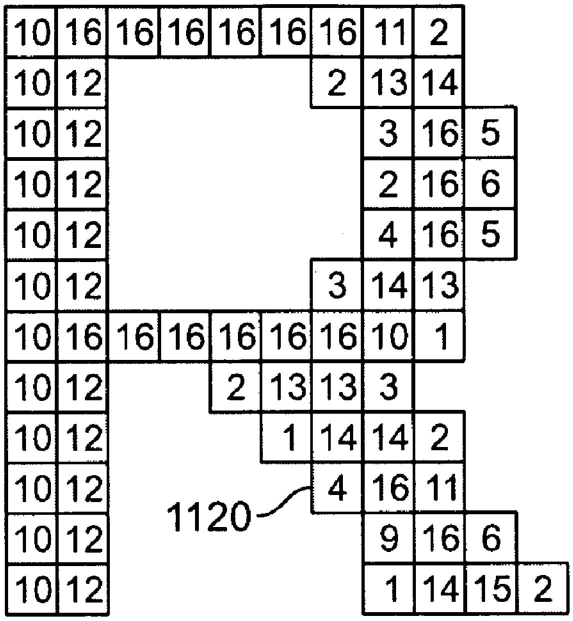
Figure 11C:
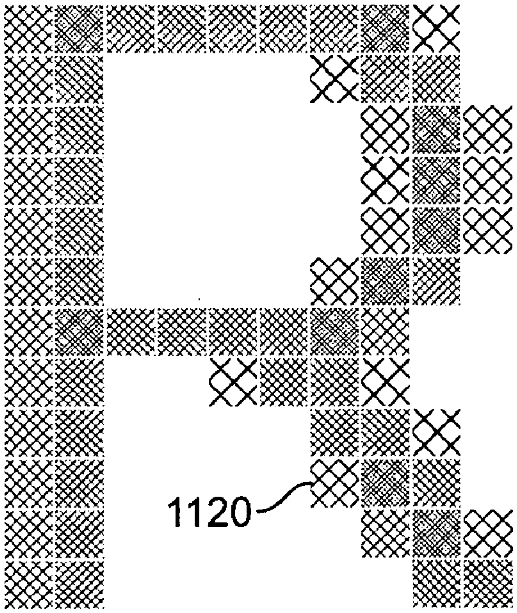

Referring to FIGS. 11B and C, the initial density values for device pixels representing the glyph are shown before adjustment. The gray scale representation 1115 in FIG. 11C is produced from the density map 1110 shown in FIG. B by converting each density value to a gray value.

Figure 11D:
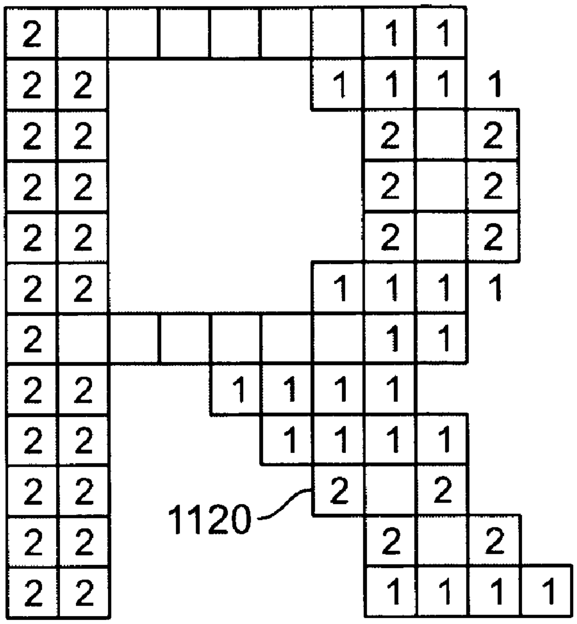
Figure 11E:
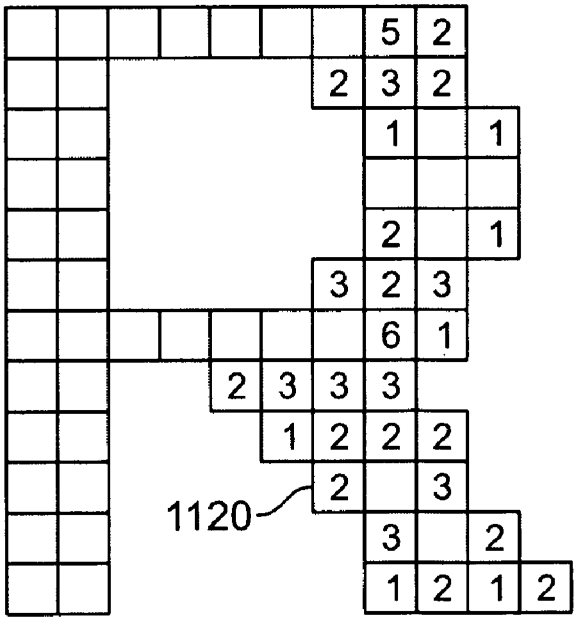

Referring to FIGS. 11D and E, the counts of vertical edges (FIG. 11D) and horizontal edges (FIG. 11E) in each device pixel are shown, and it is possible to register both a vertical and horizontal edge within the same device pixel. These values are used to calculate a final adjustment value for each device pixel. The final adjustment value for an anisotropic anti-aliased glyph can be calculated according to the following formula.

$$\text{Final Adjustment Value}=\{(VEdge/YGrid)+(HEdge/XGrid)\}\times\text{Initial Adjustment Value}$$

where:

VEdge=length of vertical edge;

YGrid=grid ratio in y direction;

HEdge=length of horizontal edge; and

XGrid=grid ratio in x direction.

As an example, the final adjustment value for device pixel 1120 can be calculated as follows:

$$(\text{Final Adjustment Value})_{1120}=\{(2/2)+(2/8)\}\times 1/16=1.25/16=1/16 \text{ (truncated to nearest } 16^{th})$$

Figure 11F:
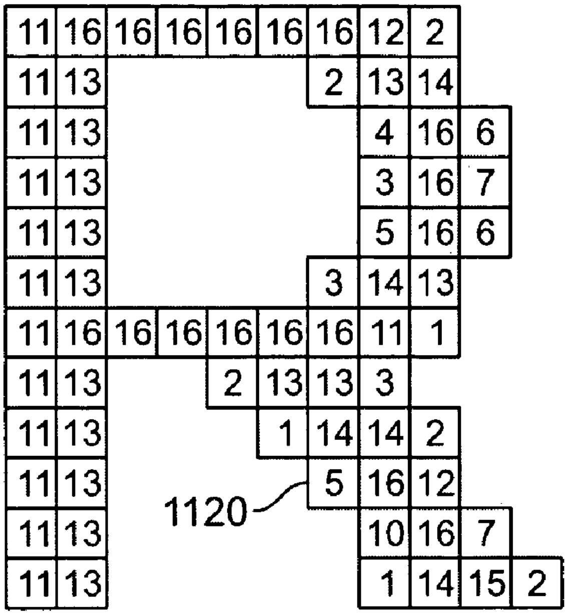

Referring to FIGS. 11F and G, a density map and a gray scale representation of the glyph are shown, respectively, including adjusted pixel density values. An adjusted density value for a device pixel is calculated by adding the final adjustment value of the device pixel to the initial density value of the device pixel. For example, the adjusted density value for device pixel 1120 can be calculated as follows:

$$(\text{Adjusted Density Value})_{120}=4/16+1/16=5/16=0.3125$$

Figure 11G:
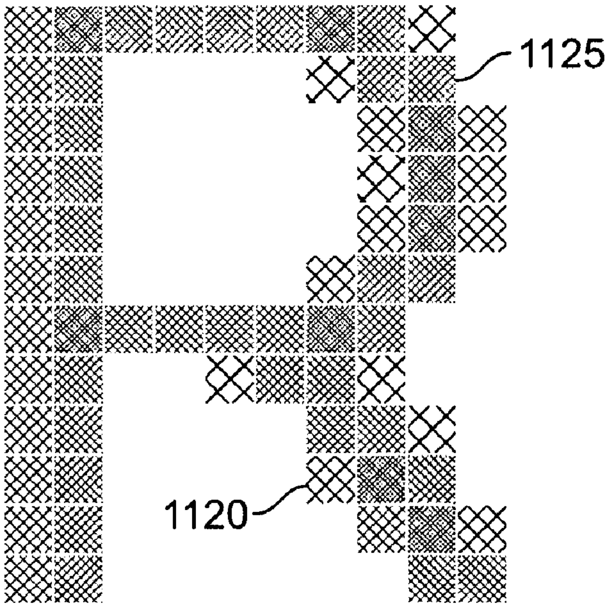

The resulting gray scale representation 1125 is shown in FIG. 11G.

The examples of pixel density value adjustment described above use equal adjustment values for each edge of a stroke. A vertical stem, for example, was adjusted using an initial adjustment value of 1/4 pixel applied to both the left and right edges of the stem. In one implementation, the density values of device pixels representing a glyph can be adjusted asymmetrically, whereby a different initial adjustment value can be applied to the two edges of a given stroke.

Referring to FIG. 8B, five additional columns can be included in an initial adjustment value table such as the table shown in FIG. 8A. Like FIG. 8A, FIG. 8B also refers to an Adobe Type 1 font to be displayed in gray scale. The tables in FIGS. 8A and 8B can be implemented as a single table. The five additional columns can include column 850 indicating whether to use asymmetric adjusting. Asymmetric adjusting means the two edges of a glyph's stroke are not adjusted by equal amounts, as was the case in the examples discussed above. Rather, one edge may be adjusted more than the other, which may be useful for maintaining contrast along one or more edges. For example, if an offset value is slightly greater than the amount by which a device pixel's intensity value is adjusted, then a device pixel that had a maximum intensity value pre-adjustment, may have an adjusted density value that is less than maximum, resulting in an edge that is no longer black. To maintain a black edge of a stroke formed by the device pixel, the device pixels along one edge may be adjusted more than on the other edge, such that device pixels along the edge (post-adjustment) are of maximum density value.

Referring again to FIG. 8B, column 852 indicates a low initial density value, column 854 indicates a low initial adjustment value, column 856 indicates a high initial density value and column 858 indicates a high initial adjustment value. If column 850 indicates that there is no asymmetric darkening (i.e., has a value of 0), then the values in the remaining four columns 852, 854, 856 and 858 are all 0, for example, rows 1–5. With respect to FIGS. 8C–G, these columns are not shown because there was no asymmetric adjusting, and the values in these five columns would have been all zeros.

In the implementation shown in FIGS. 8A and 8B, initial adjustment values can be selected as follows. As an example, consider a glyph to be rendered having a scaled stem width of 5/16ths, therefore corresponding to the row 803 in FIG. 8A and row 860 in FIG. 8B. If, upon edge detection, an initial density value of device pixels along an edge of a stroke is 0 (column 852), i.e., the edge was along a device pixel boundary, then the initial adjustment value used for the device pixels along the edge is 2/16ths (column 854). If, upon edge detection, an initial density value of device pixels along an edge of a stroke is 24 (column 856), then the initial adjustment value used for the device pixels along the edge is 6/16ths (column 858). If, upon edge detection, an initial density value of device pixels along an edge of a stroke is neither the low initial density value in column 852 nor the high initial density value in column 856, then the initial adjustment value in column 822 of FIG. 8A is used.

Figure 12:
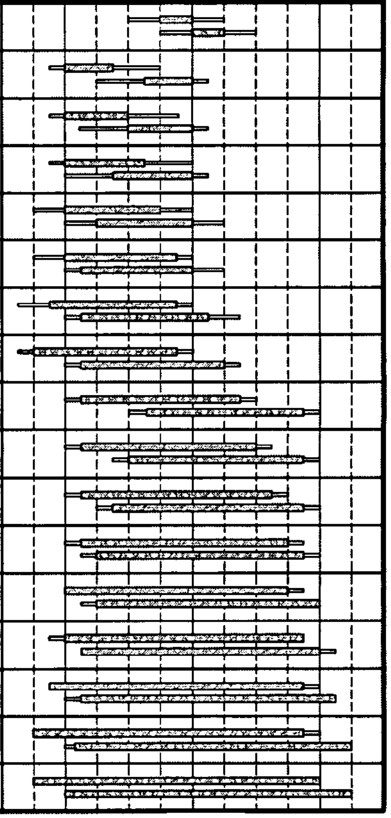
FIG. 12 shows a table illustrating phase differences at corresponding scaled stem widths.

Asymmetric adjusting can also be useful to preserve phase differences. Referring to FIG. 12, a table is shown that illustrates in the far right column 1205 two phases of a stem width having a scaled stem width equal to the value in the far left column 1210. The rasterized stem width (i.e., pre-adjustment) is shown as a bold line, and the "darkening amount" or the initial adjustment value is shown as a light line. The "phase difference" column 1215 indicates the difference in position of the stem at the two different phases.

In another implementation, a "horizontal initial adjustment value" can be calculated with respect to horizontal strokes and a "vertical initial adjustment value" can be calculated with respect to vertical strokes. A horizontal standard stem width can be determined using the techniques described above in the context of a vertical standard stem width, and a horizontal scaled stem width can then be determined from the horizontal standard stem width and a size at which a glyph is to be rendered. The horizontal initial adjustment value can then be determined based on the horizontal scaled stem width, for example, using the techniques described above, referring to tables similar to those shown in FIGS. 8A–G (which are for vertical scaled stem widths). The vertical initial adjustment value can be calculated as described above in reference to the horizontal initial adjustment value.

The horizontal initial adjustment value can be used to adjust horizontal strokes, and is therefore used to determine a final adjustment value for device pixels that will be adjusted in the y direction. The final adjustment value can be calculated based on the horizontal initial adjustment value and the length of a horizontal edge of a glyph passing through a device pixel. The vertical initial adjustment value can be used to adjust vertical strokes, and is therefore used to determine a final adjustment value for device pixels that will be adjusted in the x direction. A final adjustment value for a glyph can be calculated using the following formula:

$$\text{Final Adjustment Value}=\{(VEdge/YGrid)\times VInit\}+\{(HEdge/XGrid)\times HInit\}$$

where:

VEdge=length of vertical edge

YGrid=grid ratio in the y direction

VInit=vertical initial adjustment value

HEdge=length of horizontal edge

XGrid=grid ratio in the x direction

HInit=horizontal initial adjustment value

The glyph may be rendered offset from the device resolution grid, and may be offset equal or different amounts in the x and y directions, as described above.

In the above description, implementations have been described wherein a high resolution bitmap was generated, for example, at Step 522 and Step 1020 of FIGS. 5 and 10 respectively. Other techniques can be used, other than generating a bitmap, for example, a precursor structure referred to as a "cross array" may be generated, which includes high resolution information about where lines intersect projected pixel centers. Adjusted alpha maps may be generated from the information included in the cross-array structure. Other examples include trapezoid or triangle high resolution representations of a glyph.

Referring again to the tables in FIGS. 8A–G, a number of parameters for rendering a glyph can be decided based on a scaled stem width of the glyph. For example, consider row 804 in FIG. 8A and the corresponding row 805 in FIG. 8B. A renderer that is render a glyph in a Type 1 font in gray scale having a scaled stem width of 12/16ths, can determine from FIGS. 8A and 8B the following rendering parameters:

- x and y grid ratios
- hint grid ratio
- hinting policy
- x and y alignment
- x and y offset amounts
- whether to carry adjustment in the x and y directions
- an initial adjustment value
- whether to asymmetric adjust
- a "low" initial adjustment value for a low density value if asymmetrically adjusting
- a "high" initial adjustment value for a high density value if asymmetrically adjusting The above parameters can be collectively referred to as an example of a "rendering policy". Other rendering policies can include more, fewer and/or different parameters than those included in FIGS. 8A and 8B. The rendering policy is selected by the renderer based on the scaled stem width of a glyph to be rendered, and can be selected dynamically and pre-rasterization, e.g., before generation of a bitmap representation of the glyph.

The above description made reference to examples using fonts including Roman characters, in particular, the character R. However, it should be understood that the techniques described herein can be used with fonts including other types of characters including, for example, Japanese kanji characters, Cyrillic characters or Arabic characters. Further, the techniques can be used in alternate writing modes such as left to right, right to left or vertical.

The invention and all of the functional operations described in this specification can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; a magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results.

What is claimed is:

1. A method of rendering a glyph to make the glyph more readable, comprising:

receiving a glyph associated with a font, the glyph to be rendered at a size and having one or more strokes, including one or more horizontal or vertical strokes;

calculating an initial adjustment value for the glyph;

determining an offset amount based on the initial adjustment value such that a minimum number of device pixels will be marked by the one or more horizontal or vertical strokes after adjusting the density values of one or more device pixels representing the glyph;

rendering a high resolution representation of the glyph so that one or more edges of at least one stroke is offset from a device resolution grid by the offset amount, the high resolution representation representing a set of device pixels each having an initial density value;

for one or more of the device pixels in the set of device pixels, calculating a length of an edge of a stroke that passes through the device pixel; and adjusting the density values of the one or more device pixels by a final adjustment value based on the initial adjustment value and the length of an edge of a stroke passing through the device pixel.

2. The method of claim 1, wherein the offset amount is equal to or greater than the initial adjustment value.

3. The method of claim 1, wherein calculating an initial adjustment value comprises:

determining a standard stem width for the font;

calculating a scaled stem width from the standard stem width and the size; and determining an initial adjustment value based on the scaled stem width.

4. The method of claim 1, further comprising, determining a second offset amount, wherein the rendering step comprises rendering the glyph so that edges of the one or more strokes are offset from the device resolution grid in a first direction by the offset amount and offset from the device resolution grid in a second direction by the second offset amount.

5. The method of claim 1, wherein the high resolution representation of the glyph is rendered offset from the device resolution grid in a first direction only.

6. The method of claim 1, wherein the high resolution representation of the glyph is a high resolution bitmap.

7. The method of claim 6, wherein calculating a length of an edge of a stroke that passes through a device pixel comprises:

identifying initial adjustment pixels along the edges of the high resolution bitmap representation of the glyph, the initial adjustment pixels being high resolution pixels representative of the initial adjustment value;

wherein the length of the edge of a stroke that passes through a device pixel is a ratio of the number of initial adjustment pixels in a direction to a grid ratio in said direction.

8. A method of rendering a stroke, comprising:

receiving a path representing a stroke, the stroke to be rendered at a size;

calculating an initial adjustment value for the stroke;

determining an offset amount based on the initial adjustment value such that a minimum number of device pixels will be marked by the stroke after adjusting density values of one or more device pixels representing the stroke;

rendering a high resolution representation of the stroke so that one or more edges of the stroke is offset from a device resolution grid by the offset amount, the high resolution representation representing a set of device pixels each having an initial density value;

for one or more of the device pixels in the set of device pixels, calculating a length of an edge of the stroke that passes through the device pixel; and adjusting the density values of the one or more device pixels by a final adjustment value based on the initial adjustment value and the length of an edge of the stroke passing through the device pixel.

9. A computer program product, tangibly stored on a computer-readable medium, for rendering a glyph to make the glyph more readable, comprising instructions operable to cause a programmable processor to:

receive a glyph associated with a font, the glyph to be rendered at a size and having one or more strokes, including one or more horizontal or vertical strokes;

calculate an initial adjustment value for the glyph;

determine an offset amount based on the initial adjustment value such that a minimum number of device pixels will be marked by the one or more horizontal or vertical strokes after adjusting the density values of one or more device pixels representing the glyph;

render a high resolution representation of the glyph so that one or more edges of at least one stroke is offset from a device resolution grid by the offset amount, the high resolution representation representing a set of device pixels each having an initial density value;

for one or more of the device pixels in the set of device pixels, calculate a length of an edge of a stroke that passes through the device pixel; and adjust the density values of the one or more device pixels by a final adjustment value based on the initial adjustment value and the length of an edge of a stroke passing through the device pixel.

10. The computer program product of claim 9, wherein the offset amount is equal to or greater than the initial adjustment value.

11. The computer program product of claim 9, wherein instructions operable to calculate an initial adjustment value comprise instructions operable to:

determine a standard stem width for the font;

calculate a scaled stem width from the standard stem width and the size; and determine an initial adjustment value based on the scaled stem width.

12. The computer program product of claim 9, further comprising instructions operable to:

determine a second offset amount, wherein the rendering step comprises instructions operable to render the glyph so that edges of the one or more strokes are offset from the device resolution grid in a first direction by the offset amount and offset from the device resolution grid in a second direction by the second offset amount.

13. The computer program product of claim 9, wherein the high resolution representation of the glyph is rendered offset from the device resolution grid in a first direction only.

14. The computer program product of claim 9, wherein the high resolution representation of the glyph is a high resolution bitmap.

15. The computer program product of claim 14, wherein instructions operable to calculate a length of an edge of a stroke that passes through a device pixel comprise instructions operable to:

identify initial adjustment pixels along the edges of the high resolution bitmap representation of the glyph, the initial adjustment pixels being high resolution pixels representative of the initial adjustment value;

wherein the length of the edge of a stroke that passes through a device pixel is a ratio of the number of initial adjustment pixels in a direction to a grid ratio in direction.

16. A computer program product, tangibly stored on a computer-readable medium, for rendering a stroke, comprising instructions operable to cause a programmable processor to:

receive a path representing a stroke, the stroke to be rendered at a size;

calculate an initial adjustment value for the stroke;

determine an offset amount based on the initial adjustment value such that a minimum number of device pixels will be marked by the stroke after adjusting density values of one or more device pixels representing the stroke;

render a high resolution representation of the stroke so that one or more edges of the stroke is offset from a device resolution grid by the offset amount, the high resolution representation representing a set of device pixels each having an initial density value;

for one or more of the device pixels in the set of device pixels, calculate a length of an edge of the stroke that passes through the device pixel; and adjust the density values of the one or more device pixels by a final adjustment value based on the initial adjustment value and the length of an edge of the stroke passing through the device pixel.

17. A system for rendering a glyph to make the glyph more readable, comprising:

means for receiving a glyph associated with a font, the glyph to be rendered at a size and having one or more strokes, including one or more horizontal or vertical strokes;

means for calculating an initial adjustment value for the glyph;

means for determining an offset amount based on the initial adjustment value such that a minimum number of device pixels will be marked by the one or more horizontal or vertical strokes after adjusting the density values of one or more device pixels representing the glyph;

means for rendering a high resolution representation of the glyph so that one or more edges of at least one stroke is offset from a device resolution grid by the offset amount, the high resolution representation representing a set of device pixels each having an initial density value;

for one or more of the device pixels in the set of device pixels, means for calculating a length of an edge of a stroke that passes through the device pixel; and means for adjusting the density values of the one or more device pixels by a final adjustment value based on the initial adjustment value and the length of an edge of a stroke passing through the device pixel.

18. The system of claim 17, wherein the offset amount is equal to or greater than the initial adjustment value.

19. The system of claim 17, wherein means for calculating an initial adjustment value comprise means for:

determining a standard stem width for the font;

calculating a scaled stem width from the standard stem width and the size; and determining an initial adjustment value based on the scaled stem width.

20. The system of claim 17, further comprising, means for determining a second offset amount, wherein the means for rendering comprise means for rendering the glyph so that edges of the one or more strokes are offset from the device resolution grid in a first direction by the offset amount and offset from the device resolution grid in a second direction by the second offset amount.

21. The system of claim 17, wherein the high resolution representation of the glyph is rendered offset from the device resolution grid in a first direction only.

22. The system of claim 17, wherein the high resolution representation of the glyph is a high resolution bitmap.

23. The system of claim 22, wherein the means for calculating a length of an edge of a stroke that passes through a device pixel comprise means for:

identifying initial adjustment pixels along the edges of the high resolution bitmap representation of the glyph, the initial adjustment pixels being high resolution pixels representative of the initial adjustment value;

wherein the length of the edge of a stroke that passes through a device pixel is a ratio of the number of initial adjustment pixels in a direction to a grid ratio in said direction.

24. A system for rendering a stroke, comprising:

means for receiving a path representing a stroke, the stroke to be rendered at a size;

means for calculating an initial adjustment value for the stroke;

means for determining an offset amount based on the initial adjustment value such that a minimum number of device pixels will be marked by the stroke after adjusting density values of one or more device pixels representing the stroke;

means for rendering a high resolution representation of the stroke so that one or more edges of the stroke is offset from a device resolution grid by the offset amount, the high resolution representation representing a set of device pixels each having an initial density value;

for one or more of the device pixels in the set of device pixels, means for calculating a length of an edge of the stroke that passes through the device pixel; and means for adjusting the density values of the one or more device pixels by a final adjustment value based on the initial adjustment value and the length of an edge of the stroke. passing through the device pixel.

* * * * *